US006681383B1

(12) United States Patent
Pastor et al.

(10) Patent No.: US 6,681,383 B1
(45) Date of Patent: Jan. 20, 2004

(54) AUTOMATIC SOFTWARE PRODUCTION SYSTEM

(75) Inventors: Oscar Pastor, Valencia (ES); José Iborra, Denia Alicante (ES)

(73) Assignee: Sosy, Inc., Boston, MA (US)

( * ) Notice: Subject to any disclaimer, the term of this patent is extended or adjusted under 35 U.S.C. 154(b) by 0 days.

(21) Appl. No.: 09/543,085

(22) Filed: Apr. 4, 2000

(51) Int. Cl.$^7$ ................................................. G06F 9/44
(52) U.S. Cl. ...................................................... 717/126
(58) Field of Search .......................... 717/1, 5, 7, 126; 703/13, 20; 705/7; 345/326, 113

(56) References Cited

U.S. PATENT DOCUMENTS

| | | | |
|---|---|---|---|
| 4,734,854 A | 3/1988 | Afshar | |
| 4,841,441 A | 6/1989 | Nixon et al. | |
| 5,185,867 A | 2/1993 | Ito | |
| 5,371,895 A | 12/1994 | Bristol | |
| 5,459,866 A | 10/1995 | Akiba et al. | |
| 5,485,601 A | 1/1996 | Ching | |
| 5,561,802 A | 10/1996 | Orimo et al. | |
| 5,581,670 A | * 12/1996 | Bier et al. | 345/326 |
| 5,586,329 A | 12/1996 | Knudsen et al. | |
| 5,603,018 A | 2/1997 | Terada et al. | |
| 5,617,114 A | * 4/1997 | Bier et al. | 345/113 |
| 5,640,576 A | 6/1997 | Kobayashi et al. | |
| 5,742,754 A | 4/1998 | Tse | |
| 5,742,827 A | 4/1998 | Ohkubo et al. | |
| 5,758,160 A | 5/1998 | McInerney et al. | |
| 5,798,752 A | * 8/1998 | Buxton et al. | 345/146 |
| 5,805,891 A | 9/1998 | Bizuneh et al. | |
| 5,842,205 A | 11/1998 | Brann | |
| 5,878,262 A | 3/1999 | Shoumura et al. | |
| 5,956,725 A | 9/1999 | Burroughs et al. | |
| 5,960,200 A | * 9/1999 | Eager et al. | 717/5 |
| 5,966,534 A | 10/1999 | Cooke et al. | |
| 6,058,493 A | 5/2000 | Talley | |
| 6,385,765 B1 | * 5/2002 | Cleaveland et al. | 717/100 |

OTHER PUBLICATIONS www.google.com search listings.*
www.hotbot.com.*
Pages 1–16 8 Towards a more rigorous expression of requirements (accessed Dec. 13, 1999).

Pages 1–4 jtrl–Object Specification with TROLL light (accessed Dec. 13, 1999).

Pages 1–5 OBLOG Softward Product Description (accessed Dec. 13, 1999).

Pages 1–15 Formal Specification Languages in Conformance Testing Katy Liburdy, Meerkat Computing Martha M. Gran and Lynne S. Rosenthal, Information Technology Laboratory, National Institute of Standards of Technology(1998).

"Your Guide to Rational Rose Add–Ins", John Hsia, pp. 1–9, Jun. 1999.

"VDM++ Toolbox User Manual", IFAD, VDMTools, pp. 1–27, 1999.

"Early Specification of User–Interfaces: Toward a Formal Approach", J.P. Jacquot, et al., pp. 150–160, 1997.

"Features of VDMTools", VDMTools, pp. 1–8, Sep. 23, 1998.

John Hsia, "Your Guide to Rational Rose Add–Ins", Jun. 1999, pp. 1–9.

IFAD, VDMTools, "VDM ++ Toolbox User Manual", 1999, pp. 1–27.

J.P. Jacquot, et. al., "Early Specification of User–Interfaces: Toward a Formal Approach", 1997, pp. 150–160.

IFAD, VDMTools, "Features of VDMTools", Sep. 23, 1998, pp. 1–8.

* cited by examiner

*Primary Examiner*—Todd Ingberg
(74) *Attorney, Agent, or Firm*—Ronald Craig Fish; Ronald Craig Fish, A Law Corporation

(57) ABSTRACT

An automated software production system is provided, in which system requirements are captured, converted into a formal specification, and validated for correctness and completeness. In addition, a translator is provided to automatically generate a complete, robust software application based on the validated formal specification, including user-interface code and error handling code.

43 Claims, 7 Drawing Sheets

FIG. 5

AUTOMATIC SOFTWARE PRODUCTION SYSTEM

FIELD OF THE INVENTION

The present invention relates to computer systems and more particularly to an automatic software production system and methodology suitable for stand-alone systems and on the Internet.

BACKGROUND OF THE INVENTION

Software engineering is the application of a systematic and disciplined approach to the development and maintenance of computer programs, applications, and other software systems. Due to the increasing computerization of the world's economy, the need for effective software engineering methodologies is more important than ever.

The traditional software development process involves a number of phases. First, the requirements of the program are specified, typically in the form of a written specification document based on customer needs. Then, a software developer writes source code to implement the requirements, for example, by designing data structures and coding the system logic. Finally, the software developer undergoes an extensive testing and debugging phase in which mistakes and ambiguities in the requirements are identified and errors in the software code are fixed. Having to refine the system requirements is one of the most serious problems that might occur, because any modification to the requirements necessitates a redevelopment of the source code, starting the process all over again. Thus, the testing and debugging phase is the longest phase in the software engineering process and the most difficult to estimate completion times.

For the past forty years, there have been many attempts to improve isolated portions of the software engineering process. For example, the creation of first higher-level languages such as FORTRAN and then of structured programming languages such as ALGOL has helped ease the burden of implementing the system logic. As another example, the introduction of object-oriented methodologies has helped in the design and implementation of the data structures. These improvements in the software engineering process have lessened the mismatch between the problem space, which is the Conceptual Model for the application, and the solution space, which is the actual software code. Nevertheless, some mismatch between the problem space and the solution space remains, which gives rise to an opportunity for programming errors. Because of the programming errors, it is necessary to undergo an extensive testing and debugging phase to isolate and fix the software faults.

Lately, there has been some interest in the use of "requirements analysis" and Computer Aided Software Engineering (CASE) to facilitate the first phase of the software engineering process, which is the identification and specification of the requirements. In particular, these approaches attempt to allow for software engineers to formally specify the requirements and build a prototype to validate and test the requirements. After the requirements are tested, the prototype is discarded and the software engineer develops the complete software application based on the requirements.

One example is known as "OMTROLL", whose objective is to assist software designers by means of an Object Modeling Technique (OMT)-compliant graphical notation to build the formal specification of the system. This specification is based on the TROLL specification language and has to be refined to a complete system specification. In addition, OMTROLL has a CASE support called TrollWorkbench, which provides a prototyping function by generating an independently executable prototype from a graphical conceptual specification. The prototype generated is a C++ program that includes the static/dynamic aspects of the system and uses an Ingress database as a repository of the specification.

OBLOG is another object-oriented approach for software development that falls within the scope of the European ESPRIT project IS-CORE (Information Systems-Correctness and Reusability). The OBLOG semantics is formalized in the context of the theory of categories. OBLOG also employs a CASE tool for introducing the specifications, and enables a developer to build a prototype by supplying rewrite rules to convert the specifications into code for the prototype. The rewrite rules must be written using a specific language provided by OBLOG.

Another approach that focuses more on levels of formalism is the Object System Analysis model (OSA). The aim of OSA is to develop a method that enables system designers to work with different levels of formalism, ranging from informal to mathematically rigorous. In this context, this kind of tunable formalism encourages both theoreticians and practitioners to work with the same model allowing them to explore the difficulties encountered in making model and languages equivalent and resolve these difficulties in the context of OSA for a particular language. OSA also has a CASE support tool called IPOST, which can generate a prototype from an OSA model to validate the requirements.

A different approach has been proposed by SOFL (Structured-Object-based-Formal Language), whose aim is to address the integration of formal methods into established industrial software processes using an integration of formal methods, structured analysis and specifications, and an object-based method. SOFL facilitates the transformation from requirements specifications in a structured style to a design in an object-based style and facilitates the transformation from designs to programs in the appropriate style. In accordance with the previous arguments, the SOFL proposal attempts to overcome the fact that formal methods have not been largely used in industry, by finding mechanisms to link object-oriented methodology and structured techniques with formal methods, e.g. VDM (Vienna Development Method) style semantics for its specification modules. Combining structured and objected-oriented techniques in a single method, however, makes it difficult to clarify the method semantics; thus, effective tool support is necessary for checking consistency.

Still another approach is known as TRADE (Toolkit for Requirements and Design Engineering), whose conceptual framework distinguishes external system interactions from internal components. TRADE contains techniques from structured and object-oriented specification and design methods. A graphical editor called TCM (Toolkit for Conceptual Modeling) is provided to support the TRADE framework.

Although these approaches are of some help for the first phase, i.e. in refining the requirements before the computer application is coded, they do not address the main source for the lack of productivity during later phases of the software engineering process, namely the programming and testing/debugging phases. For example, once the requirements are identified, the software engineer typically discards the prototype generated by most of these approaches and then designs and implements the requirements in a standard programming language such as C++. The newly developed code, due to the mismatch between the problem space and the solution space, will commonly contain coding errors and will need to be extensively tested and debugged.

Even if the prototype is not discarded and used as skeleton for the final application, the software developer must still develop additional code, especially to implement the user interface and error processing. In this case, there still remains the need for testing and debugging the code the programmer has written. The rule-rewriting approach of OBLOG, moreover, fails to address this need, because the difficulties associated with programming are merely shifted one level back, to the development of the rewriting rules in an unfamiliar, proprietary language.

Other approaches include those of Rational and Sterling, but these are not based on a formal language.

Therefore, there exists a long-felt need for improving the software engineering process, especially for reducing the amount of time spent in the programming and testing phases. In addition, a need exists for a way to reducing programming errors during the course of developing a robust software application. Furthermore, there is also a need for facilitating the maintenance of software applications when their requirements have changed.

SUMMARY OF THE INVENTION

These and other needs are addressed by the present invention, in which system requirements are captured (e.g. through a graphical user interface), converted into a formal language specification hereafter all references to formal specification in this summary and the detailed description of the invention are references to this formal language specification), and validated for correctness and completeness. In addition, a translator is provided to automatically generate a complete, robust software application based on the validated formal specification. By generating the application code from the validated formal specification, error-free source code strategies can be employed, freeing the developer from having to manually produce the source code or extend an incomplete prototype. Therefore, the error-prone, manual programming phase of the traditional software engineering process is eliminated, and the testing and debugging time is greatly reduced. In one example, the software development time of an application was reduced to 27% of the original time. Software maintenance is also reduced, because the traditional coding, testing, and revalidation cycles is eliminated.

One aspect of the present invention springs from the insight that ambiguity is a major source of programming errors associated with conventional object-oriented and higher-order programming languages such as C++. Accordingly, an automated software production tool, software, and methodology are provided, in which a graphical user interface is presented to allow a user to input unambiguous formal requirements for the software application. Based on the formal requirements input for the software application, a formal specification for the software application is produced and validated, from which the software application is generated. By generating the software application directly from an unambiguous, validated formal specification, the software developer can avoid the programming errors associated with conventional programming languages, and instead work directly in the problem space. In one embodiment, error-handling instructions are also produced when the software application is generated so as to create a robust, final software application.

Another aspect of the present invention stems from the realization that a major source of inadequacy of conventional prototyping techniques is that these techniques lack the capability to specify the user interface aspects. Thus, such conventional prototypes have primitive user interfaces that are unacceptable for final, customer-ready software application. Accordingly, this aspect of the invention relates to an automated software production tool, software, and methodology that include a formal specification of a Conceptual Model that specifies requirements for a software application. The Conceptual Model includes a Presentation Model that specifies patterns for a user interface of the software application. The formal specification, which also specifies the Presentation Model, is validated; and the software application is then generated based on the validated formal specification. As a result, the generated software application includes instructions for handling the user interface in accordance with the patterns specified in the Presentation Model. In fact, the code generated for the software application is very well suited for deployment on the Internet because the code supports high-volume, transactional, scalable, and reliable system logic functions, and the Presentation Model enables creative designers not to be concerned about details of coding the user interface.

Still other objects and advantages of the present invention will become readily apparent from the following detailed description, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5 illustrates an exemplary dialog for receiving input for the functional model.

DESCRIPTION OF THE PREFERRED EMBODIMENT

An automatic software production system is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 1:
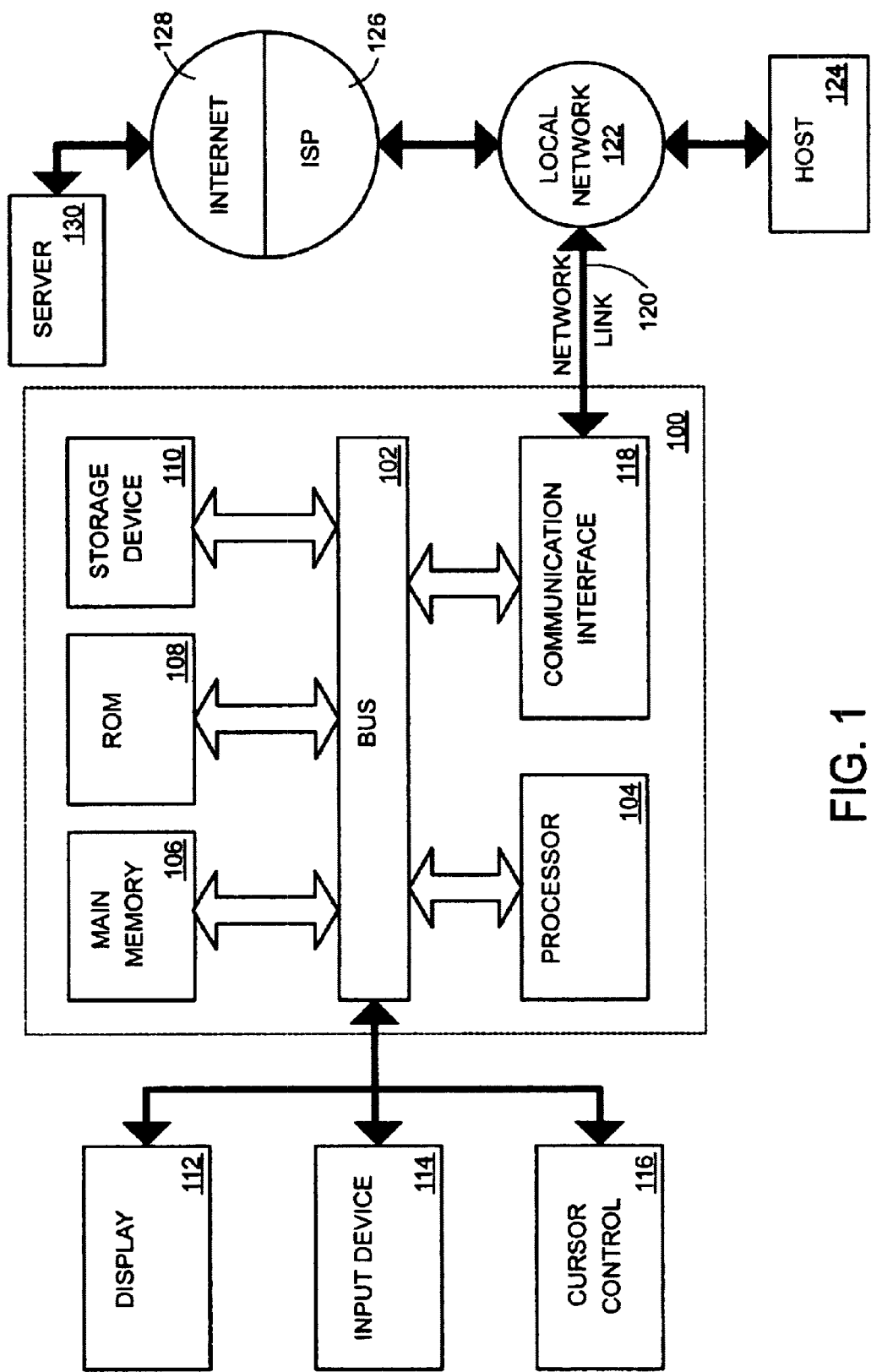
FIG. 1 depicts a computer system that can be used to implement an embodiment of the present invention.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for automatic software production. According to one embodiment of the invention, automatic software production is provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The emote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. In accordance with the invention, one such downloaded application provides for automatic software production as described herein. The received code may be executed by processor 104 as it is received, and/or stored in storage device 110, or other non-volatile storage for later execution. In this manner, computer system 100 may obtain application code in the form of a carrier wave.

CONCEPTUAL OVERVIEW

Figure 2:
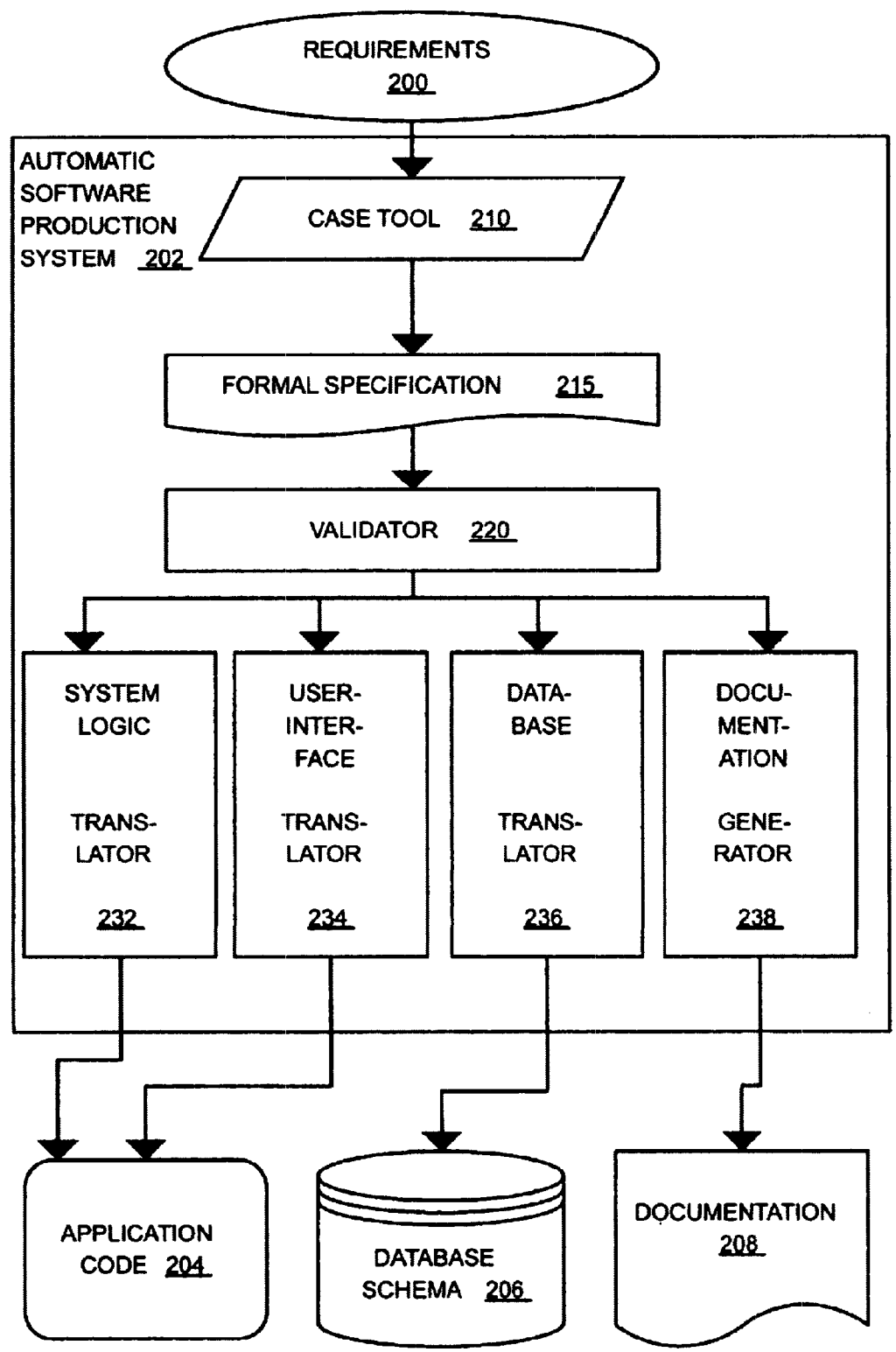
FIG. 2 is a schematic block diagram illustrating the high-level architecture and data flows of an automatic software production system in accordance with one embodiment of the present invention.

FIG. 2 is a schematic block diagram illustrating the high-level architecture and data flows of an automatic software production system 202 in accordance with one embodiment of the present invention. The automatic software production system 202 is configured to accept requirements 200 as input, and produce a complete, robust application 204 (including both system logic and user-interface code), a database schema 206, and documentation 208. In one implementation, the automatic software production system 202 includes a Computer Aided Software Engineering (CASE) tool 210 front end to allow a user to input the requirements, a validator 220 for validating the input requirements 200, and several translators to convert the validated input requirements 200 into a complete, robust application 204. These translators may include a system logic translator 232, a user-interface. translator 234, a database generator 236, and a documentation generator 238.

During operation of one embodiment, requirements 200 specifying a Conceptual Model for the application are gathered using diagrams and textual interactive dialogs presented by the CASE tool 210. Preferably, the CASE tool 210 employs object-oriented modeling techniques to avoid the complexity typically associated with the use of purely textual formal methods. In one implementation, the Conceptual Model is subdivided into four complementary models: an object model, a dynamic model, a functional model and a Presentation Model. These models are described in greater detail hereinafter. After gathering the requirements 200, the CASE tool 210 stores the input requirements as a formal specification 215 in accordance with a formal specification language for example, the OASIS language, which is an object-oriented language for information systems developed at the Valencia University of Technology in Spain. Using extended grammar defined by the formal language, the validator 220 syntactically and semantically validates the formal specification 215 to be correct and complete. If the formal specification 215 does not pass validation, no application is allowed to be generated; therefore, only correct and complete applications are allowed be generated.

If, on the other hand, the formal specification 215 does indeed pass validation, automatic software production processes, some of wich are referred to as "translators" (system logic and user interface ones), are employed to implement a precise execution model that corresponds to the validated formal specification 215. In particular, translators 232 and 234 produce application source code 204 in a high-order language such as C++, Visual Basic or JAVA for the application's system-logic and user-interface, respectively. In one implementation, a database generator 236 also produces instructions in, for example, a Structure Query Language (SQL) scripting language to create the data model for the application in an industry-standard ANSI-92 SQL Relational Database Management System (RDBMS).

In addition, one implementation also employs a document generator 238 to automatically generate serviceable system documentation from the information introduced in the Conceptual Model.

CASE MODELER

As mentioned herein above, the CASE tool 210 preferably employs object-oriented modeling techniques to avoid the complexity typically associated with the use of purely textual formal methods. Rather, four complementary models, that of the object model, the dynamic model, the functional model and the Presentation Model, are employed to allow a designer to specify the system requirements. In contrast with conventional techniques, however, the CASE tool 210 actually captures a formal specification of the designer's system "on the fly" according to a formal specification language, while the designer is specifying the system with the CASE tool 210.

This feature enables the introduction of well-defined expressions in the specification, which is often lacking in the conventional methodologies. In particular, the CASE tool 210 enforces the restriction that only the information relevant for filling a class definition in the formal specification language can be introduced. The use of a formal specification, input by means of the CASE tool 210, therefore provides the environment to validate and verify the system in the solution space, thereby obtaining a software product that is functionally equivalent to the specification as explained hereinafter. Nevertheless this is always done preserving this external view, which is compliant with the most extended modeling techniques, as stated before. In this way, the arid formalism characteristic of many conventional approaches is hidden from the designer, who is made to feel comfortable using a graphical modeling notation.

With respect to the notation, conceptual modeling in one embodiment employs diagrams that are compliant with the Unified Modeling Language (UML); thus, system designers need not learn another graphical notation in order to model an information system. In accordance with a widely accepted object oriented conceptual modeling principles, the Conceptual Model is subdivided into an object model, a dynamic model, and a functional model. These three models, however, are insufficient by themselves to specify a complete application, because a complete application also requires a user interface. Therefore, the CASE tool 210 also collects information about user-interface patterns, in a fourth model referred to as "Presentation Model", which will be translated into the code for the application. In one embodiment, the CASE tool 210 collects information organized around projects that correspond to different applications. Each project built by the CASE tool 210 can include information about classes, relationships between classes, global transactions, global functions, and views.

Each class contains attributes, services, derivations, constraints, transaction formulas, triggers, display sets, filters, population selection patterns, a state transition diagram and formal interfaces. In addition to the information in these lists, a class can also store a name, alias and a default population selection interface pattern. Extra information is stored as remarks that the designer can input information about why a class does exist in a model.

Each attribute can have the following characteristics: name, formal data type (e.g. constant, variable, derived), data type (real, string . . . ), default value, whether the attribute is an identifier for distinguishing the objects of the class, length, whether the attribute is required when the object is created, Whether the attribute can be assigned a NULL value, and a field to introduce some remarks about why the attribute has been created. Each attribute can also include information about valuations, which are formulas that declare how the object's state is changed by means of events. Valuation formulas are structured in the following parts: a condition (that must be satisfied to apply the effect), an event and an effect of the event to the particular attribute. An attribute may also include user interface patterns belonging to the Presentation Model to be applied in the corresponding services arguments related to the attribute.

Services can be of two types: events and transactions. Events are atomic operations, while transactions are composed of services which can be in turn events or transactions. Every service can have the following characteristics: name, type of service (event or transaction), service alias, remarks and a help message. Events can be of three types: new, destroy, or none of them. Events can also be shared by several classes of the project. Shared events belong to all classes sharing them. Transactions have a formula that expresses the composition of services. In addition to this information, services store a list of arguments whose characteristics are: name, data type, whether nulls are allowed as a valid value, whether the argument represents a set of objects (collection), default value, alias and remarks. Additionally, for each argument, user-interface patterns related to arguments are: introduction pattern, population selection pattern, defined selection pattern and dependency pattern. The class can also store information about derivations, and constraints. Each derivation specifies a list of pairs condition-formula, specifying which formula will be applied under every condition. Each constraint is a well formed formula plus the error message that will be displayed when the constraint was violated. For the dynamic constraints, the formula will be internally translated into a graph which constitutes the guide for its evaluation.

A class can also store triggers. Each trigger may be composed of trigger target specified in terms of self, class or object, trigger condition, triggered action (service plus list of possible agents) to be activated and a list of default values associated with the arguments of the related service. A class can also have display sets, filters and population selection patterns as user-interface patterns of the Presentation Model affecting the class. Each display set can store elements of visualization (attributes to be displayed to the user). Each filter is composed of a well formed formula and a list of auxiliary variables that are useful to define the formula. The population selection pattern is related to a display set and a filter. Classes also have a State Transition Diagram that is a set of states and transitions between them. Each state transition is related to an action (service plus list of possible agents) that can change the state of the object. Actions may have preconditions and the corresponding error message (to be displayed if the precondition does not hold). Preconditions are formulas that need to be satisfied in order to execute the corresponding action. In case of non-deterministic transitions, determinism is achieved by means of labelling each transition with a control condition. A control condition is a formula that specifies which state transition will take effect. Finally, a class can store a list of interfaces. Each interface stores the list of services that an actor can execute (agents) and the list of attributes that can be observed.

The model also maintains information on relationships between classes, which can be of two types: aggregation ("has a" or "part of") and inheritance ("is a"). Each aggregation relationship indicates composition of objects and captures the information about cardinalities (numbers of minimum and maximum participants in the aggregation relationship, whether the aggregation is static or dynamic, whether the aggregation is inclusive or referential, whether the aggregation has an identification dependence, and a grouping clause when the aggregation is multi-valued. Each inheritance relationship indicates specialization of objects and stores the name of the parent class, the name of the child class and whether the specialization is temporary or permanent. Finally, if the specialization is permanent it stores a well-formed formula on constant attributes as specialization condition. If the specialization is temporary it stores either condition or the list of events that activate/deactivate the child role.

Finally, the project can also capture a list of global transactions in which the relevant characteristics to be stored include the name of the global interaction, the formula, and the list of arguments. A list of global functions can also be captured, in which each function stores a name, a data type of the returned value, a set of arguments (similar to services), and comments about the function.

A project may have a set of views, wich constitute the particular vision that a set of selected agent classes has of the system. That is, the set of formal interfaces (attributes and services) allowed per agent class. Each agent class has a list of interfaces.

OBJECT MODEL

The object model is a graphical model that allows the system designer to specify the entities employed in the application in an object-oriented manner, in particular, by defining classes for the entities. Thus, the class definitions include, for example, attributes, services and class relationships (aggregation and inheritance). Additionally, agent relationships are specified to state that services that objects of a class are allowed to activate.

Figure 3:
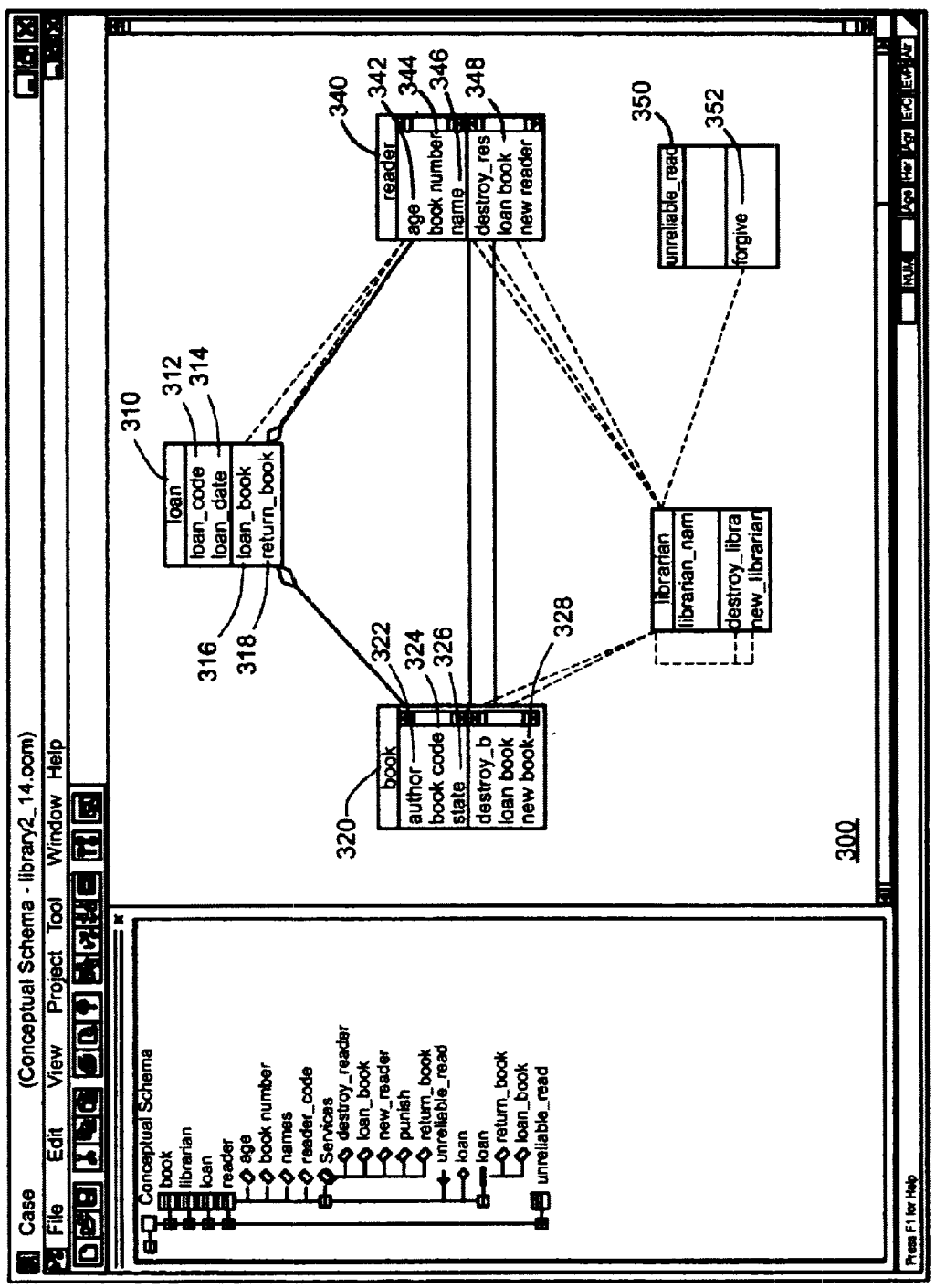
FIG. 3 illustrates an example of an object model for a library system with readers, books, and loans.

FIG. 3 illustrates an example of an object model 300 for a library system with readers, books, and loans. Classes, in the object model 300, are represented as rectangles with three areas: the class name, the attributes and the services. In the example, the object model 300 includes a loan class 310 with attributes to indicate a load code 312 and a loan date 314 for when the loan was made. The loan class 300 also includes two services (methods) including one for loaning a book 316 and another for returning the book 318.

The object model 300 also includes a book class 320 having attributes that specify the author 322 of the book, a book code 324, and a state 326 (e.g. reserved, in circulation, checked out, etc.) and services such as new_book 328 for creating a new book. Another class is a librarian class 330, whose name 332 is specified by an attribute and whose creation is done by a new_librarian service 334.

Each reader belonging to the library is described with the reader class 340, whose attributes include the age 342, the number of books 344 checked out by the reader, and the name 346 of the reader. Readers may be created with a new_reader service 348. An unreliable reader class 350 is also part of the object model to indicate for those readers 340 who cannot be trusted (e.g. due to unpaid fees for overdue books). An unreliable reader 350 may be forgiven 352 by a librarian 330.

In an object model 300, inheritance relationships are represented by using arrows to link classes. For example, the unreliable reader class 350 is connected to the reader claim 340 with an arrow; thus, the unreliable reader class 350 is specified to inherit from, or in other terms is a subclass of, the reader claim 340. The arrow linking the subclass and the base class can be leveled with a specialization condition or an event that activates or cancels the child role. In the exemplary object model 300, the arrow between the unreliable reader class 350 and the reader class 340 is labeled with a reader punish/forgive" service. Thus, if a reader 340 is punished, that person becomes an unreliable reader 350. Conversely, if an unreliable reader 350 is forgiven 352, that person becomes a normal reader 340.

Aggregation relationships are represented in the object model 300 by using a line with a diamond from a given component class to its composite class with the diamond on the composite side. The aggregation determines how many components can be attached to a given container and how many containers a component class can be associated with. In the example, a book 320 and a reader 340 are aggregated in a loan 310, because a loan 310 involves lending a book 320 to a reader 340 of the library. The representation of aggregation also includes its cardinalities in both directions (i.e. minimum and maximum numbers), role names, and relationship name. In the example, the cardinality of the loan:book relationship from loan to book is 1:1 because exactly one book is the subject of exactly one loan in this Conceptual Model, and from book to loan is 0:1 because a book may or may not be lent at any moment."

Furthermore, agent relationships are represented by dotted lines that connect the associated client class and services of the server class. In the example, a librarian 330 is an agent of a forgive service 352 of the unreliable reader class 350; thus, there is a dotted line between the forgive service 352 and the librarian class 330. This means that a librarian can forgive unreliable readers. As another example, readers 340 are agents of the loan book 316 and return book 318 services.

Finally, shared events are represented by solid lines that connect the associated events between two classes. In the example, the loan_book event is a shared event due to the solid line connecting said events in the book class 320 and the reader class 340. A shared event affects more than object, in which each object may change its state in accordance with its local specification. In the example, the loan_book event causes the state of the book 320 to be changed to "not available", the number of books of the reader 340 to be incremented, and create an instance of the loan class 310, aggregations of the book 320 and the reader 340. Since the loan_book event creates an instance of loan class 310, it is a "new" event for that aggregated class.

Additional information in the object model is specified to complete the formal description of the class. Specifically, for every class in the object model, the following information is captured as shown in TABLE 1.

TABLE 1

| ITEM | DESCRIPTION |
| --- | --- |
| Attributes | All the aforementioned properties and/or characteristics |
| Services | All the aforementioned properties and/or characteristics |
| Derivations | Derivation expressions for the derived attributes (those whose value is dependent on other attributes) |
| Constraints | Well-formed formulas stating conditions that objects of a class must satisfy |
| Complex Relationships | specific information associated with aggregation and inheritance hierarchies |
| Agents | Services that can be activated by this class |

Additional information associated with aggregation and inheritance is also collected. For aggregated classes, the additional information can specify if the aggregation is an association or a composition in accordance with the UML characterization, or if the aggregation is static or dynamic. For inheritance hierarchies, the additional information can specify if a specialization produced by the inheritance is permanent or temporal. If the specialization is permanent, then the corresponding conditions on the constant attributes must characterize the specialization relationship. On the other hand, if the specialization is temporary, then the condition based on variable attributes or the events that activate/deactivate the child role must be specified.

Some applications may require a large number of classes to fully specify. In this case, classes may be gathered into clusters. Clusters make it easier for the designer or system analyst to understand the application, one cluster at a time. Thus, clusters help reduce the complexity of the view of the object model.

DYNAMIC MODEL

The system class architecture is specified with the object model. Additional features, however, such as which object life cycles can be considered valid, and which inter-object communication can be established, also have to be input in the system specification. For this purpose, a dynamic model is provided.

The dynamic model specifies the behavior of an object in response to services, triggers and global transactions. In one embodiment, the dynamic model is represented by two diagrams, a state transition diagram and an object interaction diagram.

Figure 4A:
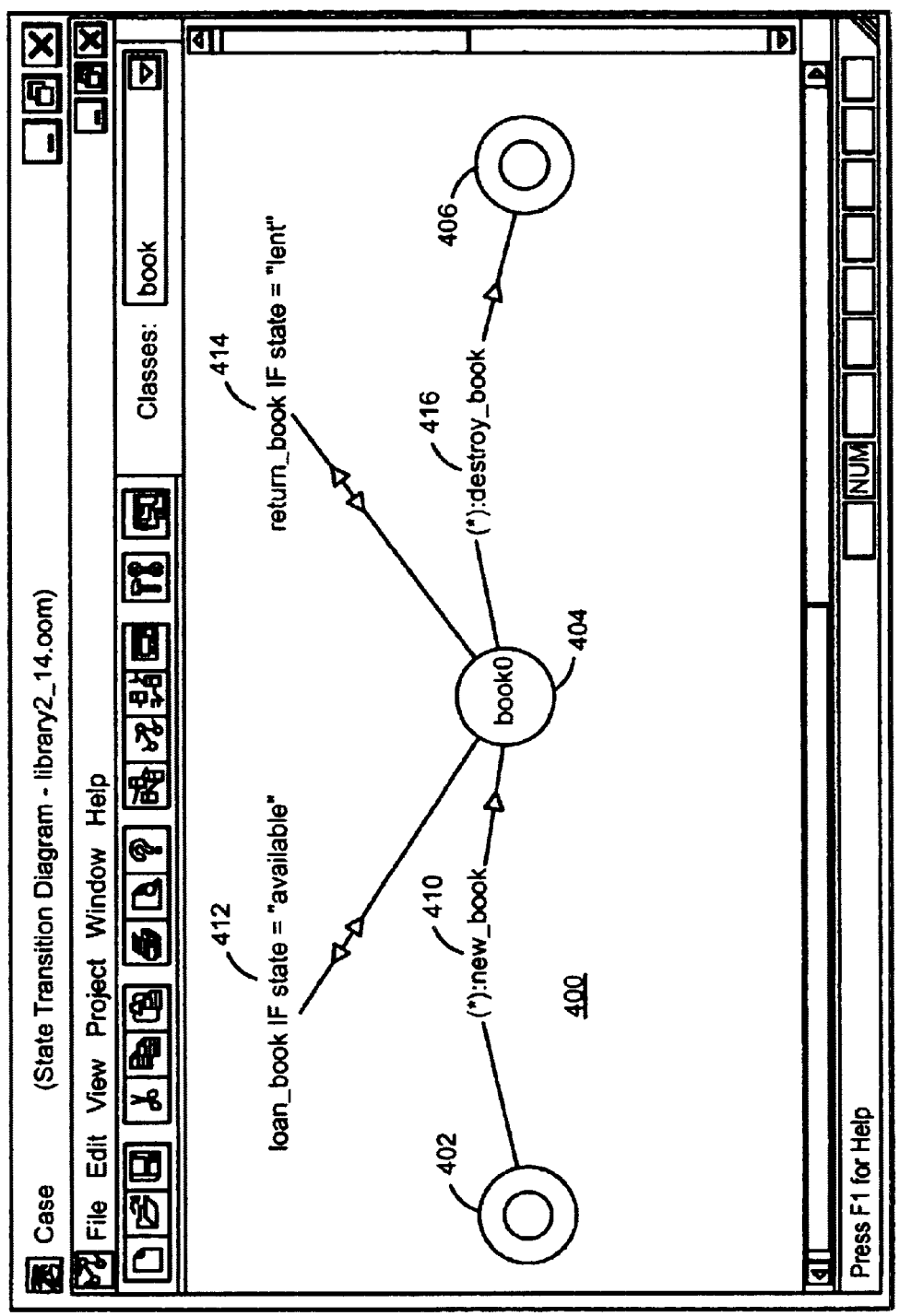
FIG. 4A illustrates an exemplary state transition diagram in accordance with one embodiment of the present invention.

The state transition diagram (STD) is used to describe correct behavior by establishing valid object life cycles for every class. A valid life refers to an appropriate sequence of states that characterizes the correct behavior of the objects that belong to a specific class. Transitions represent valid changes of state. A transition has an action and, optionally, a control condition or guard. An action is composed of a service plus a subset of its valid agents defined in the Object Model. If all the agents are selected, the transition is labeled with an asterisk (*). Control conditions are well formed formulas defined on object attributes and/or service arguments to avoid the possible non-determinism for a given action. Actions might have one precondition that must be satisfied in order to accept its execution. A circle with an imbedded circle represents the state previous to existence of the object. Transitions that have this state as source must be composed of creation actions. Similarly, a bull's eye represent the state after destruction of the object. Transitions having this state as destination must be composed of destruction actions. Intermediate states are represented by circles labeled with an state name. Accordingly, the state transition diagram shows a graphical representation of the various states of an object and transitions between the states. FIG. 4A illustrates an exemplary state transition diagram 400 in accordance with one embodiment of the present invention. States are depicted in the exemplary state transition diagram 400 by means of a circle labeled with the state name. Referring to FIG. 4A, the "book0" state 404 is indicated by a circle with the name "book0." Before an object comes into existence, a blank circle 402 is used to represent this "state" of nonexistence, which is the source of the initial transition 410 labeled by a corresponding creation action. A bull's eye 406 is used to represent the state after which an object has been destroyed, as by a transition 416 occasioned by the [*]: destroy_book action.

Transitions are represented by solid arrows from a source state to a destination state. The middle of the transition arrow is labeled with a text displaying the action, precondition and guards (if proceeds). In the example, transition 412 is labeled with a loan_book action associated with the transition 412 and a precondition 'if state="available". Thus, the system will only accept the execution of the action if the state attribute of the book is "available." In other words, the Conceptual Model requires that a book can only be loaned if the book is available. "As another example, transition 414 is labeled with a return_book action associated with the transition 414" and a precondition 'if state="lent"'. In other words, the Conceptual Model requires that a book can only be returned if the book has been lent.

The object interaction diagram specifies inter-object communication. Two basic interactions are defined: triggers, which are object services that are automatically activated when a pre-specified condition is satisfied, and global transactions, which are themselves services involving services of different objects and or other global transactions. There is one state transition diagram for every class, but only one object interaction diagram for the whole Conceptual Model, where the previous interactions will be graphically specified.

In one embodiment, boxes labeled with an underlined name represent class objects. Trigger specifications follow this syntax: destination::action if trigger-condition. The first component of the trigger is the destination, i.e., the object(s) to which the triggered service is addressed. The trigger destination can be the same object where the condition is satisfied (i.e. self), a specific object, or an entire class population if broadcasting the service. Finally, the triggered service and its corresponding triggering relationship are declared. Global Transactions are graphically specified by connecting the actions involved in the declared interaction. These actions are represented as solid lines linking the objects (boxes) that provide them.

Figure 4B:
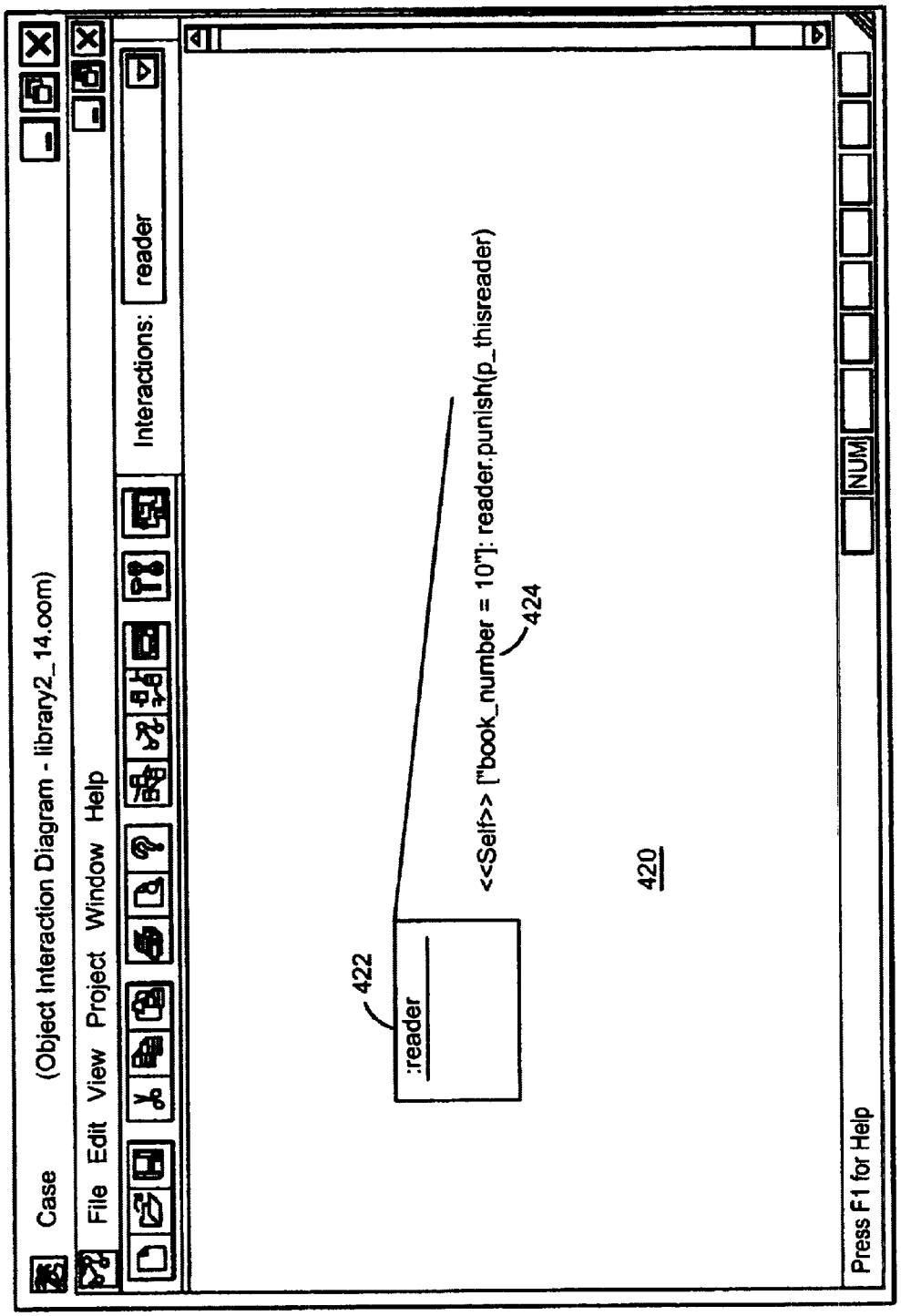
FIG. 4B illustrates an exemplary object interaction diagram in accordance with one embodiment of the present invention.

Accordingly, communication between objects and activity rules are described in the object interaction diagram, which presents graphical boxes, graphical triggers, and graphical interactions. FIG. 4B illustrates an exemplary object interaction diagram 420 in accordance with one embodiment of the present invention.

In the object interaction diagram 420, the graphical interactions are represented by lines for the components of a graphical interaction. Graphical boxes, such as reader box 422, are declared, in this case, as special boxes that can reference objects (particular or generic) such as a reader. Graphical triggers are depicted using solid lines that have a text displaying the service to execute and the triggering condition. Components of graphical interactions also use solid lines. Each one has a text displaying a number of the interaction, and the action that will be executed. In the example, trigger 424 indicates that the reader punish action is to be invoke when the number of books that a reader is currently borrowing reaches 10.

FUNCTIONAL MODEL

Many conventional systems take a shortcut when providing a functional model, which limits the correctness of a functional specification. Sometimes, the model used breaks the homogeneity of the object-oriented models, as happened with the initial versions of OMT, which proposed using the structured DFDs as a functional model. The use of DFD techniques in an object modeling context has been criticized for being imprecise, mainly because it offers a perspective of the system (the functional perspective), which differs from the other models (the object perspective). Other methods leave the free-specification of the system operations in the hands of the designer, which leads to inconsistencies.

One embodiment of the present invention, however, employs a functional model that is quite different with respect to these conventional approaches. In this functional model, the semantics associated with any change of an object state is captured as a consequence of an event occurrence. To do this, the following information is declaratively specified: how every event changes the object state depending on the arguments of the involved event, and the object's current state. This is called "valuation."

In particular, the functional model employs the concept of the categorization of valuations. Three types of valuations are defined: push-pop, state-independent and discrete-domain based. Each type fixes the pattern of information required to define its functionality.

Push-pop valuations are those whose relevant events increase or decrease the value of the attribute by a given quantity, or reset the attribute to a certain value.

State-independent valuations give a new value to the attribute involved independently of the previous attribute's value.

Discrete-domain valuations give a value to the attributes from a limited domain based on the attribute's previous value. The different values of this domain model the valid situations that are possible for the attribute.

To illustrate these features, TABLE 2 shows a functional model for a "book number" attribute 344 of the reader class 340, in a Conceptual Model representing a typical library.

TABLE 2

| CLASS: Reader ATTRIBUTE: book_number CATEGORY: push-pop | | |
|---|---|---|
| Event | Quantity | Effect |
| loan( ) | 1 | Increase |
| Return( ) | 1 | Decrease |

These valuations are categorized as a push-pop because their relevant events increase or decrease the value of the book_number attribute 344 by a given quantity (1). In the example, its related event loan( ) has the increasing effect and return( ) has the decreasing effect.

Figure 5:
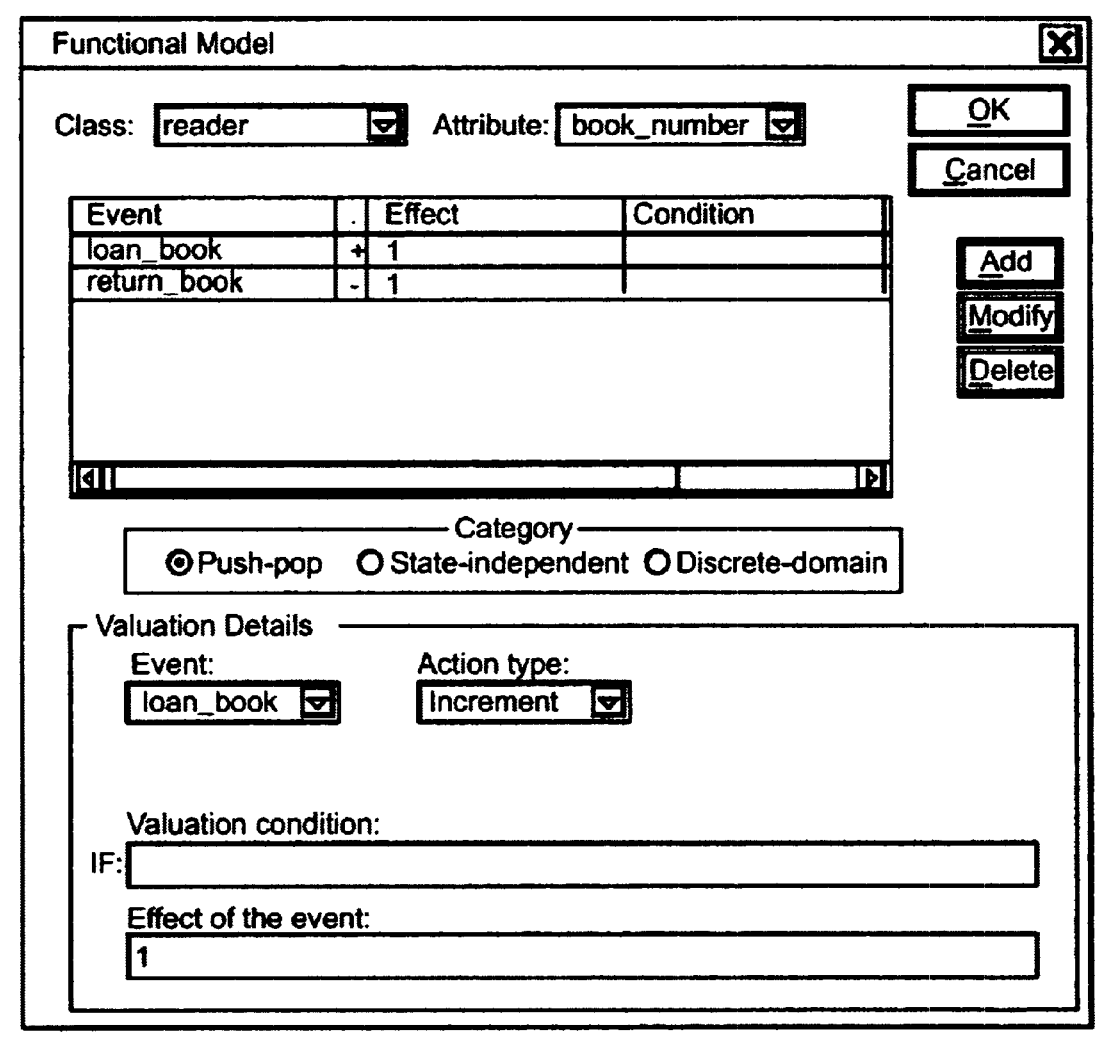

This categorization of the valuations is a contribution of one aspect of the present invention that allows a complete formal specification to be generated in an automated way, completely capturing a event's functionality Accordingly, the functional model is responsible for capturing the semantics of every change of state for the attributes of a class. It has no graphical diagram. Textual information is collected through an interactive dialog that fills the corresponding part of the Information Structures explained before. FIG. 5 illustrates an exemplary dialog for receiving input for the functional model.

PRESENTATION MODEL

The Presentation Model is a set of pre-defined concepts that can be used to describe user interface requisites. These concepts arise from distilling and abstracting repetitive scenarios in developing the user interfaces. These abstractions of the repetitive scenarios are called patterns. A set of patterns is called a pattern language.

In this sense, the Presentation Model is a collection of patterns designed to reflect user interfaces requirements. A pattern is a clear description of a recurrent problem with a recurrent solution in a given restricted domain and giving an initial context. The documented patterns abstract the essence of the problem and the essence of the solution and therefore can be applied several times to resolve problems that match with the initial context and domain. The pattern language is composed of a plurality of patterns. The present invention is not limited to any particular list of patterns, but the following is a brief description of some user interface patterns that have been found to be useful: Service Presentation Pattern, Instance Presentation Pattern, Class Population Presentation Pattern, Master-Detail Presentation Pattern and Action Selection Presentation Pattern.

A Service Presentation Pattern captures how a service will request data to the final user. This patterns controls the filling out of service arguments and contains actions to launch the service or to exit, performing no action. It is based on other lower level patterns that refer to more specific interface tasks such as an introduction pattern, defined selection pattern, population selection pattern, dependency pattern, status recovery pattern, supplementary information pattern, and argument grouping presentation:

The introduction pattern handles with restrictions to input data that must be provided to the system by the final user (i.e., the user who employs the final application). In particular, edit-masks and range-values are introduced, constraining the values that can validly be input in the interface. In this manner, the user-entry errors are reduced. This pattern can be applied to arguments in services or to attributes in classes to improve data input process through validating input arguments.

The defined selection pattern specifies a set of valid values for an argument. When the input data items are static, are a few, and are well known, the designer can declare by enumeration a set containing such valid values. This pattern is similar to those that define an enumerated type and an optional default value. Accordingly, the final user can only select an entry from the pre-specified set, thereby reducing error prone input. For example, one representation of this pattern could be a Combo-Box. This pattern can be applied to arguments in services or to attributes in classes to improve data input process.

The population selection pattern handles the display and selection of objects inform among a multiple objects. Specifically, this pattern contains a filter, a display set, and an order criterion, which respectively determine how objects are filtered (Filter Expression), what data is displayed (Display Set), and how objects are ordered (Order. Criteria). This pattern may be thought of as a SQL Select statement with columns, where for the filter expression and order by for the ordering clauses, and can be applied to object-valuated arguments in services whenever it is possible to select an object from a given population of existing objects.

The dependency pattern is a set of Event-Condition-Action (ECA) rules allowing the specification of dependency rules between arguments in services. When arguments are dependent on others, these constraints use this kind of rules.

The status recovery pattern is an implicitly created pattern that recovers data from object attributes to initialize service arguments. This can be modeled as an implicit set of dependency patterns. For example, to change the data associated of a Customer object, a form to launch the change service appears. If the user provides the Customer OID (Object Identifier), the interfaces can use this OID to search the object and recover the data associated to the Customer, such as name, telephone, address, etc.

The supplementary information pattern handles the feedback that is provided to final users in order to assure they choose or input the correct OID (object identified) for an existent object. For example, to select a Customer, an OID must be provided. If the name of the Customer is automatically displayed as answer to an OID input, the user receives a valuable feedback data that assures the user in selecting or correcting the input data. The supplementary information pattern is applicable to object-valuated arguments.

The argument grouping presentation pattern captures how to group the requested service arguments according to the user wishes.

An Instance Presentation Pattern captures how the properties of an object are presented to the final user. In this context, the user will be able to launch services or to navigate to other related objects. The instance presentation pattern is a detailed view of an instance.

A Class Population Presentation Pattern captures how the properties of multiple objects of one class are presented to the final user. In this context, once an object is selected, the final user will be able to launch a service or to navigate to other related objects. The objects can also be filtered.

A Master-Detail Presentation Pattern captures how to present a certain object of a class with other related objects that may complete the full detail of the object. To build this pattern the following patterns are used: instance presentation, class population presentation and, recursively, master-detail presentation. In this manner, multi-detail (multiple details) and multi-level master-detail (multiple levels recursively) can be modeled. For example, one scenario involves an invoice header followed by a set of invoice lines related to the invoice.

An Action Selection Pattern captures how the services are offered to final users following the principle of gradual approach. This pattern allows, for example, generating menus of application using a tree structure. The final tree structure will be obtained from the set of services specified in the classes of the Conceptual Model. The user could launch services or queries (observations) defined in the Conceptual Model.

A Filter Expression is a well-formed formula that evaluates to a Boolean type. This formula is interpreted as follows: the objects that satisfy the formula pass the filter; the ones that not fulfill the condition do not pass the filter. Consequently, the filter acts like a sift that only allows objects that fulfill the formula to pass. These formulas can contain parameters that are resolved at execution time, providing values for the variables or asking them directly to the final user. A filter pattern may be thought of as an abstraction of a SQL where clause, and is applied in a population selection pattern.

A Display Set is an ordered set of attributes that is shown to reflect the status of an object. A Display Set may be thought of as an abstraction of the columns in a SQL clause, and is applied in a population selection pattern.

The Order Criteria is an ordered set of tuples that contain: an attribute and an order (ascending/descending). This set of tuples fixes an order criterion over the filtered objects. An order criterion pattern may be thought of as an abstraction of an order by SQL clause, and is applied in a population selection pattern.

FORMAL SPECIFICATION

The CASE tool 210, after presenting a user interface for capturing system requirements 200, converts the system requirements into a formal specification 215. In particular the CASE tool 210 builds upon the previously described models as a starting point and automatically generates a corresponding formal and object-oriented specification 215, which acts as a high-level system repository. In a preferred embodiment, the formal language being employed is OASIS, version 2.2 by Oscar Pastor López and Isidro Ramos Salavert, published October 1995 by the "Servicio de Publicaciones de la Universidad Politecnica de Valencia" (legal deposit number: V-25 1285–1995).

Conversion of captured system requirements 200 into a formal specification 215 is a main feature of one aspect of the invention: each piece of information introduced in the conceptual modeling step has a corresponding formal counterpart, which is represented as formal language concept. The graphical modeling environment associated with one embodiment of the invention may be thus viewed as an advanced graphical editor for formal specifications.

Therefore, an introductory presentation of the OASIS specification language is provided herein for a more detailed view of this embodiment of the present invention. TABLE 3 shows a formal specification 215 for the reader class that was automatically obtained from the Conceptual Model:

TABLE 3

CONCEPTUAL SCHEMA library
domains nat, bool, int, date, string
class reader
identification
by_reader_code: (reader_code);
constant_attributes
age : String ;
reader_code : String ;
name : String ;
variable_attributes
book_count : Int ;
private_events
new_reader( ) new;
destroy_reader( ) destroy;
punish( );
shared_events
loan( ) with book;
return( ) with book;
constraints
static book_count < 10;
valuation
[loan( )] book_count= book_count + 1;
[return( )] book_count= book_count − 1;
preconditions
librarian:destroy_reader ( ) if
book_number = 0 ;
triggers
Self :: punish( ) if book_count = 10;
process
reader = librarian:new_reader( ) reader0;
reader0 = librarian:destroy_reader( ) +
loan ( ) reader1;
reader1= if book_count=1 return( ) reader0
+ (if book_count >1 return( )
+ if book_count <10 loan( )) reader1;
end_class
END CONCEPTUAL SCHEMA The meaning of the different sections that integrate the formal description of the exemplary reader class specification is explained. A class in OASIS is made up of a class name "reader", an identification function for instances (objects) of the class, and a type or template that all the instances share.

The identification function by_reader_code, characterizes the naming mechanism used by objects and yields a set of surrogates belonging to a predefined sort or to a sort defined by the user (the so-called domains in OASIS). These domains are imported in the class definition. The most usual are predefined as int, nat, real, bool, char, string and date. They represent numbers, boolean values, characters, strings and dates in a particular format. New domains can be introduced in a specification by defining the corresponding abstract data type.

A type is the template that collects all the properties (structure and behavior) which are shared by all the potential objects of the class being considered. Syntactically, the type can be formalized as a signature, which contains sorts, functions, attributes and events to be used, a set of axioms, which are formulas in a dynamic logic, a process query as a set of equations with variables of a sort process that are solved in a given process algebra. When these variables are instantiated, we have the ground terms that represent possible lives of instances (objects).

A class signature contains a set of sorts with a partial order relation. Among this set of sorts is the sort of interest (the class name) associated with the class being defined. A class signature also contains a set of functions including those functions included in the definition of the (predefined) sorts and the identification function whose sort is the ADT (Abstract Data Type) for identities implicitly provided with a class specification. The identification function provides values of a given sort to identify objects in order to assure that any object of a given class has a unique identity. For specification purposes, an identification is introduced mechanism comprising a declaration of one or more key maps used as aliases for identifying objects. The key maps are similar to the candidate key notion of the relational model. From a given key value, these maps return an associated object identity. Key maps will be declared as (tuples of) constant attributes.

A class signature also contains a set of attributes (constant, variable, and derived), see constant_attributes and variable_attributes sections in TABLE 3. These attributes all have the sort of the class as domain, and the given sort associated to the attribute being considered as co-domain.

A set of events is also contained in the class signature (see private events and shared events in TABLE 3), with the sort of the class as the domain, plus any additional sort representing event information, and with the sort of the class (sort of interest) as the co-domain. This so-called sort of interest can be seen as a sub-sort of a general sort process when objects are viewed as processes.

Each event occurrence is labeled by the agent that is allowed to activate it. When dealing with this actor notion, if the agent x initiates event a is written x: a and called an action; x could be the environment or any object of a system class. In one embodiment, an event always is associated with an agent. When defining an event, the designer is therefore forced to state which agent will be able to activate it. Consequently, a set A of actions may be defined and obtained from and attached to the initial set of events.

In this way, the notion of the set of object services can be represented as an interface that allows other objects to access the state. The object services can be events (server view) or actions (client view) depending on whether these services are offered or requested. Actions become services requested by an object, by which the object can consult or modify states of other objects (or its own state).

In OASIS, there are the following kinds of dynamic formulas (set of class axioms):

Evaluations are formulas of the form $\phi$ [a]$\phi'$ whose semantics is given by defining a $\rho$ function that, from a ground action a returns a function between possible worlds. In other words, being a possible world for an object any valid state, the $\rho$ function determines which transitions between object states are valid after the execution of an action a. In the example, there are the following evaluations:

[loan( )] book_count=book_count+1;

[return( )] book_count=book_count−1;

Within this dynamic logic environment, the formula $\phi$ is evaluated in s ∈ W, and $\phi'$ is evaluated in $\rho(a)$, with $\rho(a)$ being the world represented by the object state after the execution in s of the action considered.

Derivations are formulas of the type $\phi \rightarrow \phi'$. They define derived attributes $\phi'$ in terms of the given derivation condition (stated in ϕ). Derivations basically differ from the evaluation formulas in that this derived evaluation is done in a unique state.

Integrity constraints are formulas that must be satisfied in every world. Static and dynamic integrity constraints may be distinguished. Static integrity constraints are those defined for every possible world. They must always hold. On the other hand, dynamic integrity constraints are those that relate different worlds. They require the use of a temporal logic, with the corresponding temporal logic operators.

Preconditions are formulas with the template ¬ϕ[a]false, where ϕ is a formula that must hold in the world previous to the execution of action a. Only in the worlds where ϕ holds, is a allowed to occur. If ¬ϕ holds, the occurrence of a gives no state as successor. We have the following precondition in the reader specification:

book_number=0 [librarian:destroy_reader( )] false;

or, in a more convenient way for specification purposes, we can write librarian:destroy_reader( ) if book_number=0

Triggers are formulas of the form ϕ[¬a]false, where ¬a is the action negation. This formula means that a does not occur, and what does occur is not specified. If ϕ holds and an action other than a occurs, then there is no successor state. This forces a to occur or the system remains in a blocked state. For instance, using the appropriate dynamic formula where we include in the triggered service information about the destination (according to the trigger expressiveness presented when the object interaction diagram 420 was introduced), we will declare:

book_count=10 [Self::punish( )] false

This trigger may be written in an equivalent but more conventional way for specification purposes as:

Self::punish( ) if book_count=10;

Thus, triggers are actions activated when the condition stated in ϕ holds. The main difference between preconditions and triggers comes from the fact that in triggers there is an obligation to activate an action as soon as the given condition is satisfied. In this way triggers allow us to introduce internal activity in the Object Society that is being modeled.

In any of these dynamic formulas, ϕ, ϕ' are well-formed formulas in a first order logic that usually refer to a given system state characterized by the set of values attached to attributes of objects in the state or world considered.

In OASIS, an object is defined as an observable process. The process specification in a class allows us to specify object dynamics and determines the access relationship between the states of instances. Processes are constructed by using events as atomic actions. However, the designer also has the choice of grouping events in execution units, which are called transactions.

The molecular units that are the transactions have two main properties. First, they follow an all-or-nothing policy with respect to the execution of the involved events: when a failure happens during a transaction execution, the resultant state will be the initial one. Second, they exhibit the non-observability of intermediate states.

We will finish this section introducing the process specification of the reader class in TABLE 4:

TABLE 4

| | |
|---|---|
| reader = | librarian:new_reader ( ) •reader_0; |
| reader_0 = | librarian:destroy_reader ( ) + loan ( ) •reader_1; |
| reader_1 = | if book_count=1 return ( ) • reader_0 + (if book_count > 1 return ( ) + if book_count < 10 loan( )) •reader_1; |

The execution of processes are represented by terms in a well-defined algebra of processes. Thus, possible object lives can be declared as terms whose elements are transactions and events. Every process can be rewritten to a term in a basic process algebra BPA_δε, with the •. (sequence) and + (alternative) process operations. This provides an implementation of concurrence based on arbitrary interleaving.

After having presented Conceptual Model and the OASIS formal concepts associated with them in accordance with one embodiment of the present invention, the mappings will now be discussed that generate a textual system representation 215 (that is a specification in OASIS) taking as input the graphical information introduced in the Conceptual Model. This formal specification 215 has in fact been obtained using CASE tool 210, and constitutes a solid system documentation to obtain a final software product which is compliant with the initial requirements, as represented in the source Conceptual Model.

According to the class template introduced in the previous section, the set of conceptual patterns and their corresponding OASIS representation.

The system classes are obtained from the object model. For each class, there are a set of constant, variable or derived attributes; a set of services, including private and shared events and local transactions; integrity constraints specified for the class; and derivation expressions corresponding to the derived attributes. For a complex class (those defined by using the provided aggregation and inheritance class operators), the object model also provides the particular characteristics specified for the corresponding complex aggregated or specialized class.

The information given by the object model basically specifies the system class framework, where the class signature is precisely declared. The dynamic model uses two kind of diagrams, the state transition diagram and the object interaction diagram. From the state transition diagram, the following are obtained: event preconditions, which are those formulas labeling the event transitions; the process definition of a class, where the template for valid object lives is fixed. From the object interaction diagram, two other features of an OASIS class specification are completed: trigger relationships and global transactions, which are those involving different objects.

Finally, the functional model yields the dynamic formulas related to evaluations, where the effect of events on attributes is specified.

Having thus clearly defined the set of relevant information that can be introduced in a Conceptual Model in accordance with an embodiment of the present invention, the formal specification 215 corresponding to the requirements 200 provides a precise system repository where the system description is completely captured, according to the OASIS object-oriented model. This enables the implementation process (execution model) to be undertaken from a well-defined starting point, where the pieces of information involved are meaningful because they come from a finite catalogue of conceptual modeling patterns, which, furthermore, have a formal counterpart in OASIS.

MODEL VALIDATION

Automatic software production of a complete, robust application from a Conceptual Model to an implementation language (such as a third generation languages like C, C++, or Java) requires the Conceptual Model to be both correct and complete. In this section, the terms "correct" and "complete" have the following meanings dependent on the specific needs for the automated software production process system as:

A Conceptual Model is "complete" when there is no missing information in the requirements specification. In other words, all the required properties of the Conceptual Model are defined and have a value.

A Conceptual Model is "correct" when the information introduced in the Conceptual Model is syntactically and semantically consistent and not ambiguous. In other words, all the properties defined in the Conceptual Model have a valid value.

Referring back to FIG. 2, the validator 220 receives as input the formal specification 215 of the Conceptual Model using an Object-Oriented Formal Specification Language (such as OASIS) as high level data repository. From a formal point of view, a validated OASIS specification 215 is correct and complete because the specification 215 is formally equivalent to a dynamic logic theory, using a well-defined declarative and operational semantics.

Formal specification languages benefit from the ability of formal environments to ensure that formal specifications 215 are valid or can be checked to be valid. Formal languages define a grammar that rules language expressiveness.

Two procedures are used for Conceptual Model validation. For completeness, validation rules are implemented by directly checking the gathered data for the Conceptual Model, e.g., a class must have name, one attribute being its identifier and one service. For correctness, an extended formal specification language grammar is implemented in order to validate the syntax and meaning of all the formulas in the Conceptual Model.

CORRECTNESS

More specifically, for completeness, all the elements in a formal specification language have a set of properties that both have to exist and must have a valid value. Most of the properties are strictly implemented to have a full definition and valid values. However, the CASE tool 210 allows, for easy of use during a model inputting, to leave some properties incomplete or with invalid values. These properties will be checked by the validator 220 to be complete (and correct) prior to any automatic software production process.

The elements which are used to validate a Conceptual Model are described next. For each element it is stated if validation will be strict (e.g. when all his properties have to exist and must have a valid value at creation time) or flexible (e.g. validation will be accomplished at a later time). Some properties are optional, (e.g. that may not exist) but if they are defined, they must be validated. These elements are given in TABLE 5:

TABLE 5

Class

| | |
|---|---|
| ○ Name. | Strict |
| ○ ID function | Flexible |
| ○ Attributes (at least one) | Flexible |
| ○ Services (at least Create service). | Flexible |
| ○ Static and Dynamic Integrity Constraints (optional) | |
| ■ Their formula | Strict |

Attribute

| | |
|---|---|
| ○ Name. | Strict |
| ○ Type (Constant, Variable, Derived). | Strict |
| ○ Data-type (Real, integer, etc). | Strict |
| ○ Default Value. | Strict |
| ○ Size(if proceeds) | Strict |
| ○ Request in Creation service. | Strict |
| ○ Null value allowed. | Strict |
| ○ Evaluations (variable attributes). | Flexible |
| ○ Derivation formula (derived attributes). | Flexible |

TABLE 5-continued

Evaluation

| | |
|---|---|
| ○ One variable attribute of a class | Strict |
| ○ One service of the same class | Strict |
| ○ Condition (optional). | Strict |
| ○ Formula of evaluation. | Strict |

Derivation

| | |
|---|---|
| ○ Formula. | Strict |
| ○ Condition (optional). | Strict |

Service

| | |
|---|---|
| ○ Name. | Strict |
| ○ Arguments. | |
| ■ argument's name | Strict |
| ■ data-type | Strict |
| ■ default value (optional) | Strict |
| ■ null value | Strict |
| ■ size (if proceeds) | Strict |
| ○ For a transaction, its formula. | Flexible |

Preconditions of an action

| | |
|---|---|
| ○ Formula. | Strict |
| ■ Agents affected by condition | Strict |

Relationship: Aggregation

| | |
|---|---|
| ○ Related classes (component & composite) | Strict |
| ○ Relationship name. | Strict |
| ○ Both directions Role names. | Strict |
| ○ Cardinality. | Strict |
| ○ Inclusive or referential. | Strict |
| ○ Dynamic. | Strict |
| ○ Clause "Group By" (Optional). | Strict |
| ○ Insertion and deletion events (if proceed) Strict | |

Relationship: Inheritance

| | |
|---|---|
| ○ Related classes (parent & child) | Strict |
| ○ Temporal (versus permanent) | Strict |
| ○ Specialization condition or events | Strict |

Relationship: Agent

| | |
|---|---|
| ○ Agent class and service allowed to activate. | Strict |

State Transition Diagram (STD)

| | |
|---|---|
| ○ All states of class (3 at least). | Flexible |

State in STD

| | |
|---|---|
| ○ Name. | Strict |

Transition in STD

| | |
|---|---|
| ○ Estate of origin. | Strict |
| ○ Estate of destination. | Strict |
| ○ Service of class. | Strict |
| ■ Control condition (optional). | Strict |

Trigger

| | |
|---|---|
| ○ Condition. | Strict |
| ○ Class or instance of destination. | Strict |
| ○ Target (self, object, class) | Strict |
| ○ Activated service. | Strict |
| ○ Service arguments' initialization (Optional) | |
| ■ Arguments' values | Strict |

Global Interactions

| | |
|---|---|
| ○ Name. | Strict |
| ○ Formula. | Strict |

User exit functions

| | |
|---|---|
| ○ Name. | Strict |
| ○ Return data-type | Strict |
| ○ Arguments, (Optional) | |
| ■ Argument's name | Strict |
| ■ Argument's data-type | Strict |

COMPLETENESS

Some properties of components in formal specification languages are "well formed formulas" that follow a well-defined syntax. It is therefore, a requirement to ensure that all introduced formulas in the Conceptual Model were both syntactical and semantically correct.

Not all formulas used in the Conceptual Model have the same purpose. Therefore, there will be several types of formulas. Depending of formula's type, the use of certain operators and terms (operands, like: constants, class attributes, user-functions, etc.) are allowed. A process and a set of rules in grammar to validate every type of formula in the Conceptual Model also exist.

More specifically, the Conceptual Model includes formulas of the following types as shown in TABLE 6:

TABLE 6

Default Value Calculation of
   ○ Class Attributes (Constant and Variable)
   ○ Service and Transaction Arguments
Inheritance: Specialization condition
Static and Dynamic Integrity Constraints
Derivations and Valuations:
   ○ Calculation formula (Derived or Variable attributes respectively)
   ○ Conditions (optional)
Preconditions for actions (Services or Transactions)
Control Conditions for transitions in State Transitions Diagram
Triggering conditions
Local and Global Transactions formulas These formulas are validated at the time they are introduced, by preventing the designer from leaving an interactive textual dialog if formula is not syntactically and semantically correct.

In general, every formula must be syntactically correct; every class must have an identification function; every class must have a creation event; every triggering formula must be semantically correct (e.g. self triggers to an unrelated class are forbidden); and every name of an aggregation must be unique in the conceptual schema. If these conditions are not satisfied, then an error is raised.

A warning may be raised, on the other hand, if any of the following do not hold: every class should have a destroy event; every derived attribute should have at least a derivation formula; every service should have an agent declared to execute it; and every argument declared in a service should be used.

Validation process will also be invoked every time the designer performs a change into the model that may invalidate one or more formulas. As mentioned earlier, for ease of use, certain type of formulas are allowed to be incorrect, which the designer will have to review at a later time. The automatic software production process in accordance with one embodiment of the present invention, however, will not continue to code generation, if not all the formulas are correct. Each time the designer introduces a modification in the Conceptual Model specification, all affected formulas will be checked. As a result, the following cases may happen:

1. If any of the affected formulas makes reference to a "Strict" property, the change will be rejected. An error will be raised to inform the designer.

2. If none of the affected formulas reference a "Strict" property, a modification to the Conceptual Model will be accepted. An action-confirmation dialog is displayed before any action is taken.

3. If there is no affected formula, modification is performed straightaway. In order to validate the user interface information, the validator 220 checks the following for errors: the patterns defined must be well constructed with no essential information lacking; the attributes used in filters must be visible from the definition class; the attributes used in order criteria must be visible from the definition class; the formula in a filter must be a well-formed formula using the terms defined in the model; the action selection pattern must use as final actions objects defined in the Conceptual Model; and the set of dependency patterns must be terminal and have confluence. Warnings may be generated under the following conditions: if a pattern is defined but not used (applied), or if an instance pattern is duplicated.

Automatic software production from Conceptual Models requires these Conceptual Models to be correct and complete. Applying the characteristics and properties of formal specification languages makes it possible to effectively validate a Conceptual Model. The validation process is based on the grammar defined by the formal specification language, and partial validation is to be invoked any time the designer introduces modifications to the Conceptual Model specification. Prior to any automatic software production process, Conceptual Model will be validated in a full validation as a pre-requisite.

TRANSLATION OVERVIEW

Figure 6:
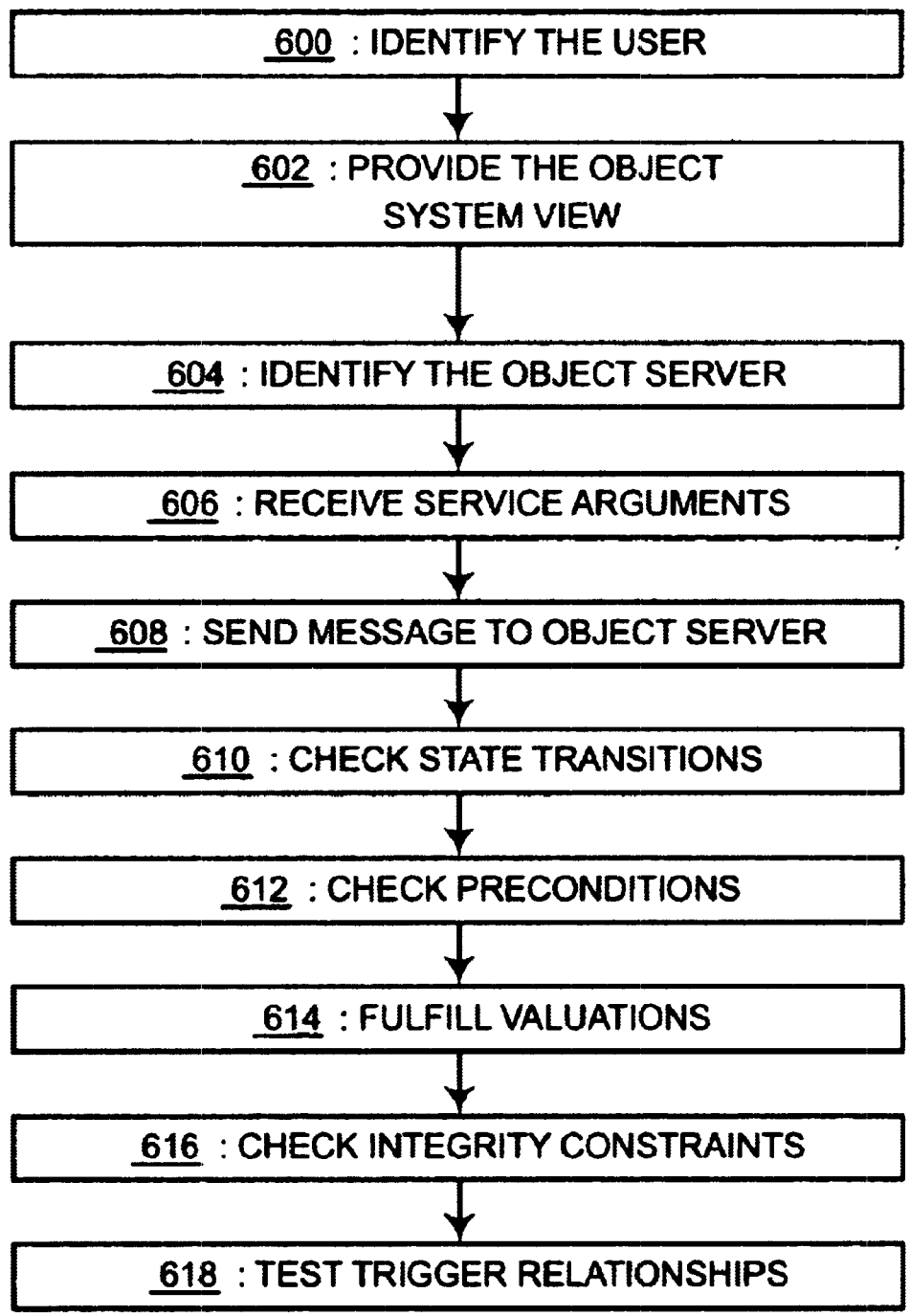
FIG. 6 is a flow diagram illustrating the high level view of the operation of translating a formal specification into a full application by following what it is referred to as an "Execution Model".

The validated formal specification 215 is the source for an execution model that handles the implementation-dependent features associated with a particular machine representation. To implement the specified system, the way in which users interact with system objects is predefined. In accordance with one embodiment, the execution template presented in FIG. 6 can be used to achieve this behavior. FIG. 6 is a flow diagram illustrating the high level view of the operation of translating a formal specification into a full application by following what it is referred to as "execution model".

The process starts by logging the user into the system and identifying the user (step 600). An object system view is provided (step 602), determined by the set of object attributes and services that the user can see or activate. After the user is connected and has a clear object system view, the user can then activate any available service in the user's worldview. Among these services, there will be observations (object queries), local services, or transactions served by other objects.

Any service activation has two steps: build the message and execute message if possible. In order to build the message, the user has to provide information to identify the object server (step 604). The existence of the object server is an implicit condition for executing any service, except for the service new. Subsequently, the user introduces service arguments (step 606) of the service being activated (if necessary) to build the message.

Once the message is sent (step 608), the service execution is characterized by the occurrence of the following sequence of actions in the server object. The state transition is checked (step 610) for verifying that a valid transition exists in the formal specification for the selected service in the current object state. The preconditions are checked for their satisfaction (step 612) for indicating that the precondition associated to the service must hold. If either of these actions does not hold, an exception will arise and the message is ignored.

Otherwise, the process continues with fulfilling the validations (step 614) where the induced service modifications take place in the involved object state. To assure that the service execution leads the object to a valid state, the integrity constraints (step 616) are verified in the final state. If the constraint does not hold, an exception will arise and the previous change of state is ignored. After a valid change of state, the set of condition-action rules that represents the internal system activity is verified. If any of them hold, the specified service will be triggered (step 618).

Accordingly, the steps illustrated in FIG. 6 guide the implementation of any program to assure the functional equivalence between the object system specification collected in the Conceptual Model and its reification in an imperative programming environment.

In one embodiment of the present invention, several translators may be used to complement the CASE tool 210 to constitute an automatic software production system. In one implementation, for example, the translators produce an application in accordance with a three-tiered architecture suitable, for example, for Internet applications. Particularly, three different translators arise, corresponding to each tier: a system logic translator 232, a user-interface translator 234, and a database generator 236. In addition, a fourth translator is used, documentation generator 238. These different translators are characterized by the output produced and, though potentially having the same input, each translator focuses on a particular subset of information in the above mentioned high level repository 215.

SYSTEM LOGIC TRANSLATION

The system logic translator 232 automatically generates code for a third generation programming language from information in the high level repository. The output of the system logic translator 232 corresponds with the middle-tier in a three-tiered architecture.

In one embodiment, the system logic translator 232 produces source code that covers the following: (1) communications subsystem with the user interface functions, (2) access to and communication with the persistence layer, (3) standard query services for reading the persistence layer contents, and (4) error handling produced by the persistence layer and client communications.

The communications subsystem is configured for receiving requests from a client, invoking internal methods, and returning replies to requesters, that verify the requestor's existence and authorization to perform the requested service; verify the existence and validity of the requested server instance; create a copy of the requested server instance in memory accessing the persistence layer for persistent attributes or calculating the value of derived ones; validate state transition for the requested service as specified in the state transition diagram 400 in the Conceptual Model; verify that the requested service's preconditions hold; perform all valuations related to the requested service as specified in the functional model; verify constraints for the new state achieved by the requested server instance; check trigger conditions to execute the corresponding actions; and make changes in the requested server instance persistent.

In addition, code is generated for access to and communication with the persistence layer, service standard queries to read persistence layer contents, and handle errors produced by the persistence layer and communications with client in one implementation for examples the generated code may include scripting to create and drop tables, constraints, and indexes to define a data model in a Relational Database System (RDBMS) in accordance with the validated spcification 215 of the Conceptual Model.

In one embodiment, the first phase of code generation is the retrieval of information from the Conceptual Model 215 and storage of this information in code generation structures in memory. Three kinds of elements guide the retrieval of information: classes, global transactions, and global functions. Relevant information to be obtained from classes in the Conceptual Model include: name, constant attributes (name, type, requested upon creation, and initialization value formula), variable attributes (name, type, requested upon creation, initialization value formula, and null values admittance), derived attributes (name, type, and derivation formula), identification function, events (name, arguments: name and type, and precondition formula), transactions (name, type, arguments: name and type, precondition formula, and transaction formula), valuation formulae, state transitions (initial state, final state, service name, valid agents, and transition condition formula), static constraints formulae, dynamic constraints formulae, trigger conditions formulae, ancestor class (name), specialized classes (name, specialization condition formula, precondition redefinitions, and valuation redefinitions), aggregation relationships (related class, cardinalities, static or dynamic, and role names), and population selection patterns (filter: name and filter variables, order criteria).

Relevant information to be obtained from global interactions in the Conceptual Model includes: name, arguments (name and type), and global interaction formula. Relevant information to be obtained from global functions in the Conceptual Model: include: name, return type, and arguments (name and type).

Generated code follows a component-based structure, based on the main unit of information that is found in the Conceptual Model, that is: the class. Each class in the Conceptual Model yields, in a first approach, several of software components. For example, one component, referred to as a "server component" has an interface comprising a method for each service present in the signature of the corresponding class. Another component, whose interface comprises the methods necessary to query the population of the corresponding class, is called a "query component." A particular kind of executive component is the component relating to global interactions defined in the Conceptual Model, whose interface consists of a method per global interaction.

These components constitute the two access points the second or middle tier offered to the first or presentation tier. Server components receive requests from the presentation tier that relate to the execution of services, and query components receive requests from the presentation tier that relate with querying the persistence tier. This is appropriate for Internet-deployed applications, because this allows for context-free, scalable, transactional solutions. Nevertheless these are not the only components generated.

Another generated component directly related to a class of the Conceptual Model is the one called "Executive Component" and is responsible for resolving or executing each of the services in the signature of the corresponding class. This component receives request from its corresponding server component or from other executive components.

Since a main purpose of the executive component is to resolve the services offered in the class signature, the interface presented by the executive component to the other components comprises a method per service. Each of these methods is structured according to the execution model in accordance with an embodiment of the invention.

In other words, the executive component is responsible for the following operations: verify the existence and validity for the requested server instance; create a copy of the requested server instance in memory accessing the persistence layer (by means of the above mentioned corresponding query component) to retrieve the values of constant and variable attributes; validate state transition for the requested service and the present state of the requested server instance as specified in the corresponding state transition diagram in the Conceptual Model; verify the satisfaction of the requested service preconditions; modify the value of the instance variable attributes by performing all valuations affected by the service as specified in the functional model of the Conceptual Model, thus changing the state of the requested server instance; validate the new state achieved by the requested server instance by verifying its static and dynamic restrictions; check trigger conditions to determine which actions should be triggered if needed; communicate with the persistence layer for all persistent attributes of the requested server instance. Additionally, if the class is an agent of any service, another method is added to the interface whose purpose is that of validating the requestor's existence.

Another kind of executive component is a component related to global interactions defined in the Conceptual Model, whose interface consists of a method per global interaction.

If the class belongs to an inheritance hierarchy, all executive components of the same hierarchy are grouped into a single, special executive component. Nevertheless there would still be one server component per class in the hierarchy.

Another component to which a class in the Conceptual Model gives rise is a component called the "T component". This component is used to store a copy of the constant and variable attributes of an instance of the corresponding class, as well as the methods to calculate the value of its derived attributes. The corresponding query component implements a collection whose items are T components.

Another component to which a class in the Conceptual Model may give rise is a component called "P component". This component is used to store in memory the values needed to initialize the constant and variable attributes of the corresponding class when creating an instance of it, or just the values of the attributes that constitute the class identification mechanism. Such a component appears whenever the corresponding class is a multi-valued component of an aggregation relationship.

Another component to which a class in the Conceptual Model may give rise is a component called "PL component". This component implements a collection whose items are P components, as well as the methods needed to add and get items from the collection, and get the number of items in the collection. Such a component appears whenever the corresponding class is a multi-valued component of an aggregation relationship.

Another component to which a class in the Conceptual Model may give rise is a component called "C Components". This component is used to store in memory the values needed to initialize the constant and variable attributes of the corresponding class when creating an instance of it. Such a component appears whenever the corresponding class is a temporal or permanent, condition-based, specialization.

Additional components includes a CC component, an error component, a trigger component, a trigger list component, an instance list component, and condition, disjunction, and conjunction components.

The CC component appears whenever there is, at least one temporal or permanent, condition-based, specialization in the Conceptual Model. The CC component implements a collection whose items are C components, a pair of methods to add and get items to the collection (one pair per C component generated), and a method to get the number of items in the collection.

The error component always appears and is used to store information about the success or failure of a service execution. The trigger component stores information about a satisfied trigger condition so that the corresponding action can be later executed. The trigger list component implements a collection whose items are trigger components, as well as the methods to add an item to the collection, get any item from the collection, get the first item and get the number of items in the collection.

The instance list component implements a collection whose items are executive components playing in the execution of a given service. In addition to methods used to add an item to the collection, get an item, and get the number of items in the collection, this component implements a method to empty the collection and another one to look for an instance by its identification function.

The condition, disjunction and conjunction Components are always generated and support the construction of complex boolean expressions, used to query the persistence layer, structured as a conjunction of disjunctions. The condition component stores information about a simple boolean condition, that is: two operands and an operator $(+,-,*,/,=, \Diamond <,<,<=,>=,>\ldots)$. The disjunction component implements a collection whose items are condition components (that is, a disjunction of conditions), as well as methods to add and get a condition from the collection and a method to get the number of conditions in the collection. The conjunction component implements a collection whose items are disjunction components (that is, a conjunction of disjunctions), as well as methods to add and get a disjunction from the collection and a method to get the number of disjunctions in the collection.

In addition, two modules are also generated: a global module for grouping attributes and methods shared through the generated code, and a global functions module that groups the code of all global functions defined in the Conceptual Model.

TRANSLATION STRATEGY AND ARCHITECTURE

In accordance with one embodiment, code generation is driven by the information retrieved from the high level repository 215. The translation process can be divided into four phases: validation of the Conceptual Model (performed by validator 220), translation of the corresponding data model into a relational database management system (performed by database generator 236), retrieval of information from the Conceptual Model and storage of this information in memory structures and finally, generation of files from the information stored in memory (e.g. reading the information in memory structures to generate code in the target programming language).

Validation of the Conceptual Model is mandatory, while data model translation is optional, but both can be considered as prerequisites to the other two phases which are the ones strictly related to code generation. Translation structures are designed to store input information from the Conceptual Model and all have a method that uses this information to generate source code in the target programming language.

These translation structures include: a class to store information needed to generate server components (server class), a class to store information needed to generate server components for global interactions (global interactions server class), a class to store information needed to generate executive components (analysis class), a class to store information needed to generate executive components for global interactions (global interactions analysis class), a class to store information needed to generate executive components for inheritance hierarchies (inheritance hierarchy analysis class), a class to store information needed to generate query components (query class), a class to store information needed to generate T components (T class), a class to store information needed to generate C components (C class), a class to store information needed to generate CC component (CC class), a class to store information needed to generate P components (P class), a class to store information needed to generate PL components (PL class), a class to store information on the arguments for every service of every class in the Conceptual Model (arguments list class), a class to store information on the identification function of every class in the Conceptual Model (analysis class list class), classes to generate the methods needed to resolve a service in executive components (event class, shared event class, transaction class, interaction class), classes to generate the auxiliary methods needed to resolve a service in both executive components and executive components for inheritance hierarchies (precondition class, static constraints class, dynamic constraints class, ... etc.). classes to generate methods needed in query and T components (T & Q method classes), a class to generate inheritance-specific methods (inheritance method class), and a class to monitor the generation process (code generation class).

The code generation class is responsible for retrieving all the information needed to generate code and for doing so in the appropriate order, for writing to files the generated code and organizing it into files properly according to the component-based structure. The code generation class maintains lists of the above mentioned generation structures in memory in which information retrieved from the Conceptual Model is to be stored and it later loops through these lists to write the appropriate files.

The information retrieval process basically comprises a series of loops through the classes in the Conceptual Model to gather all information needed, a loop trough global interactions and a loop through global functions in the Conceptual Model.

The last phase in the code generation process covers writing to files according to the component-based structure presented herein. This process comprises: looping through the lists of instances above described that maintain the information needed to generate components and their attributes and methods, and call each element's code generation method; generating global interactions executive component; generating global interactions server component; generating global functions module; and generating standard components.

For each global function a method is generated. The method has the same name as the global function and a translated return type. Each argument of the method has the same name of the corresponding argument of the global function and a translated type.

USER-INTERFACE TRANSLATION

In one embodiment, where the user-interface translator 234 automatically generates source code for a high order programming language such as Visual BASIC or JAVA from information in the high level repository. However, code may be generated in any computed language. Its output corresponds with the presentation tier in a three-tiered architecture. Thus, the user-interface translator 234 provides as output the source code of a component that implements the user interface functionality. This component is automatically generated without human intervention. The user-interface translator 234 uses as input data a validated Conceptual Model 215 and offers as output data, source code in a third generation language that implements an equivalent functional prototype related to the Conceptual Model the component is derived from.

In one embodiment of the present invention, the user-interface translator 234 produces source code to perform the following: a communications subsystem able to send requests to a business component, and receive replies; a logon to system for user authentication; and a menu of available services for specific authenticated user. For each available service, frame, screen or data collection dialog of all service arguments, the user-interface translator 234 generates code that sets initial values for arguments, validates introduced data (type, range, object existence, etc.), and calling to server activation. In addition, the user-interface translator 234 generates code for standard query services that list all instances status in a class and error handling.

Additionally, code is generated for a wider and flexible user-interface operation. In a query service frame, form or screen, the following functionality will be available when a certain instance has been selected: navigation through relationships with related selected object. This navigation is used to browse among related data items following its related links; thus, the resultant code is suitable for Internet applications. Additional functionality includes services activation for selected object; advanced query services including: filters (population selection), views (status selection), and sorting criteria; and context keeping for filling-in known services arguments. Context keeping is a user-facility. Context is data associated to the working user environment. This data is useful to provide default values for service arguments.

For its input, the user-interface translator 234 reads specification 215 of a Conceptual Model and stores this kind of information in intermediate structures in memory. The user-interface translator 234 is independent of the input medium in which the Conceptual Model is provided. In this way, the intermediate structures can be loaded from different data sources. The model is iterated in several passes to extract the relevant information in each phase of the translation process from the formal specification, including information about classes, aggregation relationships, inheritance relationships, agent relationships, global interactions, user defined functions, and interface patterns.

Translated applications are composed by forms that contain the user-interface offered to final user. A form, in abstract sense, is the interaction unit with the final user. Forms are translated depending on capabilities of the target environment to match the requirements: e.g. windows dialogues for Windows environments, HTML pages in Web platforms, applets in Java, etc.

Translated applications supply the user connection to the system. The user connection is resolved using an access form to authenticate the agent. In addition, the translated application provides a system user view. A user must be able to access services the user can launch. The main form is designed to accomplish this task.

For each service that can be executed by a user, the translated application generates an activation service form. For each class, the translated application generates a query/ selection form. This form allows users to query data instances, search instances that fulfill a given condition, observe related instances and know which services can be launched for a given object in its current state. For each service, the translated application furnishes initialization values for object-valued arguments. Initial data is also provided by managing information obtained from the browse made by the user.

The user encounters different scenarios interacting with the application. These scenarios lead to define different types of forms. In the next section, each kind of form will be described.

In the Conceptual Model 215, some classes are defined as agents of services classes (called agent classes). That is, if an object is a service agent it is allowed to request the service. Each agent object must be validated authenticated before trying to request services. The Access Form requests an agent class (selected from a list of valid agents classes), an object identifier and a password. The data collected is used to verify if there exists a valid agent object that is allowed to access the system.

The Application Main Form contains a menu, where user can view the services he is allowed to execute. The source code associated to each action realized by user is automatically generated.

For each accessible service for at least one agent, a Service Form is generated. These forms have an introduction field for each argument the user must provide. This argument's fields have attached code to validate data-types, sizes, value-ranges, nulls, etc. Object-valued fields provide facilities to search the object browsing information and filtering it. Code is generated to accomplish this task.

Each service argument can take its initial value in three different ways:

1. By Initial values. In the Conceptual Model, the designer can provide default values for attributes and arguments. If such value exists, code must be generated to supply the value.

2. By Context. Context information (for example, a list of recently observed objects) is useful to suggest values to object-valued arguments that have the same type that collected ones. A function is generated to search appropriate values in the recently visited objects list.

3. By Dependency Pattern. In the Conceptual Model, the system designer can define Dependency Patterns. The Status Recovery pattern is an implicit set of dependency patterns too. In both cases, the change on an argument, can affect to values in another ones. So, certain argument values can be initially fixed in this way.

Data Validation can occur just after data input, interactively warning the user and just before sending data to system-logic. Object-valuated arguments validation requires checking object existence. To support validation, a function is generated for each service argument. The function is invoked before sending a request to system-logic.

When the user requests service execution, the service arguments are validated. If the service arguments are valid, system logic is invoked to accomplish the service. The message built to invoke the system-logic uses the formal order to sort the arguments. After executing the service, the user is informed whether the service succeeded or not. This transactional approach is ideal for Internet applications. Accordingly, code to validate arguments and Code to invoke the system-logic with necessary arguments in the formal order are generated. Furthermore, possible errors are returned to inform the user.

The Query/Selection Form permits the querying of objects (that can be restrained by filters) and the selection of an object. When an object is selected, the user can browse to other data items related to the object. In the same way, the user can launch a service of the selected object.

These query/selection forms include graphic items representing filters. A visual component is used to filter the population of a class. Filters may contain variables. In such cases, fields for the variables are requested to users in order to form the condition of the filter. For example: Find cars by color, by type and model.

These query/selection forms also include a visual component to show objects. Inside this component objects that fulfill the filter condition (or every class population if filters are not defined) appear. The attributes displayed in the component are set by a Display Set.

These query/selection forms also include a visual component to launch services. For example: given a car, the user can launch services in order to rent the car, return, or sell it. This task is achieved by a function that determines which service to launch of what object. The corresponding Service Form is invoked for each exposed service. These query/selection forms also include a component to initiate the browsing. For example: given a car, the user can view the driver, the driver's sons, etc. When the user navigates (follows a link from an object) a new query/selection form is displayed. In the same way that the previous component, there exists code to invoke the next form to display when user browses objects. When a query/selection form is reached by navigation, the form receives information about the previous object in order to display only the data related to that initial object.

In the applications, visited objects and navigation paths followed by users are stored. This information is named Context Information. When the user browses data between query/selection forms, the path followed is stored. Finally, when the user tries to invoke a service and a service form is needed, the application can provide, as an extra input to the service form, this contextual information. Then, the Service Form uses this data to provide initial values for object-valuated arguments.

USER-INTERFACE TRANSLATOR ARCHITECTURE

Using the Conceptual Model 215 used as input, the user-interface translator 234 can retrieve information from memory structures, a relational database, using a query API or any other input source. An intermediate structure in memory is filled with the Conceptual Model data relevant for translating the user-interface component. Intermediate structure follows an architecture to the one defined in the Conceptual Model schema in which can be queried for classes, services, and attributes for a specific Conceptual Model.

When data is loaded in the intermediate structure, the real translation phase begins. Inside the source code files of the generated application, two types of files can be distinguished. One type of files is a set of files having fixed contains. These files correspond to structures or auxiliary functions widely used that are always produced in the same way. These files are generated by dumping byte streams directly from the translator to final files in order to create them. Other files strongly depend from the Conceptual Model that is being processed. Therefore, although these files have a well-defined structure (detailed in the previous section), they have variable parts depending on the processed model. The user-interface translator 234 iterates the Conceptual Model to extract the relevant data to generate these variable parts.

The translation process for the user-interface translator 234 has the following tasks:

1. Generate the fixed files, e.g. headers, definitions, constants, and auxiliary functions to its respective files.

2. Generate auxiliary widgets (controls or Java Beans) depending on the application 3. For each class, generate a query/selection form, an instance selection component, a specialization component (if class is specialized from other class an requires extra initialization). For each service class, also generate a service form.

4. Generate an access form (identification).

5. Generate a main form containing the menu application.

6. Generate communication functions to reach system-logic server. These functions encapsulate the invocation of services available in the prototypes.

The Access Form is a little dialog box containing: a list of agent classes (from this list, the user chooses one), a field where the user provides OID for a valid object instance belonging to the previously selected class and a field for password. This form is mostly generated in a fixed way. The only varying section for each model is the mentioned agent classes list. By iterating over the model classes list and by checking which classes are agents such agent classes list can be obtained.

In order to provide access to the application's functionality, the services are arranged in an access-hierarchy to be converted to menu bars (Visual Basic client), HTTP pages (Web client) or any other structure that allows browsing. By default, the hierarchy is built by iterating the classes and services in the Conceptual Model. The hierarchy can bee seen as an access tree to the application. For each class a tree item is built labeled with class alias. For each built-in item this mode has the following items as descendents: an item labeled as 'Query' to access a query form; an item for each service defined in the current class labeled with the service alias; and, in the case of inheritance relationship with other classes, an item is built for each direct subclass labeled with subclass alias. Recursively, the same algorithm is applied until the inheritance tree is fully explored.

A Service Form requires the following input data extracted from the Conceptual Model: Service to generate, service class, arguments list, interface patterns linked to arguments. For each service, a form is generated that contains a graphic part and a functional part. The graphic part includes a widget attached to each argument that needs to be asked to user and a pair of widgets to accept or cancel the service launch. The functional part includes code to implement the event-drivers for the previous widgets, to initialize the properties of theses widgets with default values, to validate introduced values, and to invoke the service in the system-logic component.

A detailed explanation of how to generate a Service Form follows. First, two argument lists are obtained. The first one corresponds to the arguments defined in the service declaration (FL, Formal List). In this list the arguments are sorted by its formal declaration order. The second one contains the same arguments sorted by the presentation order (PL, Presentation List). Both orders are specified in the Conceptual Model.

Iterating through the formal List and for each argument: create a widget for each argument that has to be requested to user and set relevant properties to arguments like: type, size, can be null, Introduction Pattern, Defined Selection Pattern or Population Selection Pattern Widgets are added for OK and Cancel commands, and graphic positions of widgets are arranged so they do not overlap. In one implementation, the form is divided in a logical grid of n columns by n rows and assign positions from left to right and from top to bottom to conveniently arrange the widgets. The logical positions are translated to physical position in the target language and rearrange action commands in the bottom-right corner of the form. Finally, the form is resized to adjust the size of data contained therein.

For output, the standard header of a form is dumped to a file. This step is dependent of the target language selected. Then, the graphic part of form is dumped to the file, including the definition of basic form properties, the definition of each widget., and the widgets' actions.

Finally, the source code attached to this form is translated and dumped. This process includes translating generic functions to manage events in the form, such as open and close events and produce code to assign and free resources. Also, functions to handle the Status Recovery Pattern and dependencies between widgets are translated. Depending on the Status Recovery Pattern attached to the service, and possible Dependency Patterns defined in the service, code for changing argument values must be generated and the code that triggers such dependencies. The validation code is also translated too. There are validation methods to check the values gathered in the widgets are right. Finally, a function to translate service calling into invocation to system-logic services is generated. The function built contains: a reference to system-logic object where the service is going to be executed; the invocation to a method that implements the service in the system-logic; and the arguments necessary to such function, constructed from values supplied form user through widgets.

In order to generate a query/selection form, the following Conceptual Model information is required: a class and its properties (alias), and the list of the Population Selection interface patterns defined for the class. Each pattern contains: a display set, a filter, and a sort criterion. In case there is no visualization set defined, the list of attributes belonging to the class is assumed. If a class lacks a population selection pattern, the following default values will be assumed: every attribute defined in the class is considered as part of the display set, and neither a filter (in this case the whole population of the class is returned) nor a sort criteria are attached.

Generating a query/selection form also requires information about the relationships of the class. For every class, a form is generated based on this information and contains a tabular representation of the display sets of the class, a set of grouped filters that allow to restrict search through the population, and a pop-up menu including navigability links to the classes related to the first one and available services to be launched over instances of the class.

The generated software component, which has been described before, provides the user-interface client functionality that includes all the required functionality for both validating and executing a prototype compliant to the Conceptual Model it has been derived from. The applications of the component are: prototyping, user validation of the Conceptual Model before capturing new requirements; testing to validate the Conceptual Model by analysts to verify that the model faithfully reflects the requirements; and ultimate application production, once the process of requirements capture is completed, the generated component can be considered as a final version implementing a functionally complete and ergonomic user interface. The component can be edited to customize the application to users desires with very little effort.

DATA MODEL TRANSLATION

In one embodiment, the database generator 236 automatically defines a data model in a Relational Database Management System (RDBMS) according to the validated specification in the high level repository 215. However, other forms of persistent storage may be used. Such as flat files, serialized files or Object Oriented databases. The output of the database generator 236 output corresponds with the persistence tier in a multi-tiered architecture.

From the information in the high level repository about a given Conceptual Model, scripts are generated in order to create and delete tables, constraints (primary and foreign keys) and indexes. Scripts can optionally be executed in a Relational Database Management System to effectively create said data model.

From the point of view of relational databases, data is stored in tables with relationships between them. However, from the object oriented programming point of view, data is stored in object hierarchies.

Although the automatic software production system in accordance with one embodiment of the present invention is based on an object oriented methodology, it is necessary to find a physical data storage system to permanently store data managed by generated applications. Relational databases are preferred, because they are the industry-standard way to store data and, consequently, use of tables instead of objects as it would be desirable. Nevertheless, many object-oriented applications, like those produced by in accordance with an embodiment of the present invention, can be compatible with the Relational Model, since the static aspects of objects can be stored in tables following a translation process.

The generated data model comprises a set of tables and the corresponding relationships, as well as constraints on primary and foreign keys and indexes. The generated data model reflects system data with the attributes defined in the classes specification and other class instances properties like their state, role if they are agents.

Information, gathered from the high level repository 215 and needed to produce the corresponding data model, focuses on classes and include the name, constant attributes (either emergent or inherited); variable Attributes (either emergent or inherited); identification function; inherited identification function; aggregation relationships (either emergent or inherited); and agent information.

Preferably, the generated scripts follow a standard: ANSI SQL 92. This fact means that the generated data model can fit any database management system based on ANSI SQL 92, particularly most well known relational database management systems.

The process to obtain the data model follows these steps: For each elemental class of the Conceptual Model, a table in the selected relational database is created. For each constant or variable attribute in the class specification, a field in the table corresponding to the class is created. The field data type depends on Conceptual Model attribute data type translated into the target relational database. Derived attributes are not stored in the database since their value will be calculated upon request by special methods in the server code generated.

Primary keys are determined by attributes marked in the Conceptual Model as being identification attributes. Thus table fields corresponding to these attributes will constitute the primary key of the table. As a particular case, tables corresponding to specialized classes, in addition to fields representing emergent attributes, have fields that correspond to attributes that constitute the primary key of the table representing their ancestor class. If a specialized class does not have an identification function of its own, these fields, copied from the ancestor class, constitute the specialized table primary key. At the same time, they constitute the foreign key to. the parent class table. On the other hand, if a specialized class has its own identification function, these fields only constitute a foreign key to the parent class table.

Aggregation case is more complicated, because aggregation has more dimensions. The aggregation relationship dimensions determine its cardinalities that in turn determine representation in the database: If the relationship is multi-valued (maximum cardinality set to M) in both senses a new table is added in order to represent this aggregation relationship. This table has a field for each one that constitutes the primary key of related tables. The set of all this fields constitutes the primary key and, individually, fields coming from each related table's primary key, constitute foreign keys to each related table.

If the relationship is uni-valued (maximum cardinality set to 1) in one sense, the class related with only one instance of the other one copies the fields of the primary of the other one. These fields constitute a foreign key to the related class table.

If the relationship is uni-valued in both senses, any of the tables could have the foreign key to the other. The adopted option in this case is that the aggregate class have the reference to the component class. With respect to minimum cardinalities, if minimum cardinality is 0 then the corresponding field will take null values. Otherwise it will not. If identification dependence exists between two classes then fields of the primary key of the non-dependent class are copied to the table corresponding to the dependent class. They will be part of its primary key, and be a foreign key to the table of the non-depending class.

Indexes may be generated to optimize searches and reduce response time. For each foreign key, an index will be generated so foreign keys will also be search indexes.

So far the static aspects of an object have been covered, but some dynamic aspects need also be discussed. The occurrence of services characterize the evolution in an object's life for an object's state changes whenever a service happens since the value of its attributes characterize its state. The state transition diagram determines valid lives for an object. In order to monitor state transition, a new field will be added to each table corresponding to a class, to store the name of the state in the state transition diagram in which an object is at a given instant.

Generated applications may perform user authentication by requesting identification and password to agents logging on to the system. A new field will be added to tables corresponding to classes that are agents of any service in the system, to store the password of said agent.

DOCUMENTATION TRANSLATION

The CASE tool 210 allows for additional information to be introduced at analysis time, which can be used to generate system's documentation. Accordingly, the documentation generator 238 automatically produces a set of documents including the formal specification, full Conceptual Model details documentation, user's help, and others, from information in the high level repository 215.

Due to their different nature, there is an specific generation process for the formal system specification. The rest of produced documents are based in a generic data process. This process allows to obtain the same documents in different formats and define any new type of document CASE tools must provide multiple documents that can be automatically generated from Conceptual Models previously gathered. The documentation generator 238 answers the need for information requests and queries performed on a Conceptual Model. The documentation generator 238 allows generation of queries, specific manuscripts or well-formed documents in order to document properly a project.

In a preferred embodiment, complete generation of Conceptual Model is generated in an ASCII format in OASIS syntax, which comprises the part of the Conceptual Model related to analysis of the problem, as Presentation Model Interface Patterns, are not included with this syntax.

Document generator provides, by default, general documents, services documents, and help documents. The general documents include a natural language specification description. The services documents include a detailed description of classes and services. The help documents contain an on-line help for generated prototypes.

The Documentation Generator uses as target languages some recognized standard formats for documentation: ASCII, plain text, navigational HTML with multiple documents, navigational HTML with one document, LaTeX, and Rich Text Format (RTF).

This Documentation System is scalable and can be extended to add a new kind of document or target language. Adding a new target language allows to all defined documents to be generated with this new language. In the same way, adding a new document type will should be generated to any supported target language.

In order to produce a formal specification, a process iterates over the information structures and writes to a file the corresponding text strings in the formal language. In the inner process, the iteration over the structures can be detail as: (1) write specification headers; (2) For all class selected to be described: write its formal template (attributes, events, derivations, restrictions, preconditions, triggers and process); (3) for all global transaction, write its declaration and formal definition; and (4) write the end spec.

A document is generated in an intermediate block language (IBL). In such language the document is a block of document type and contains n child blocks. Recursively, by continence relation and having fixed a block taxonomy, documents can be defined based on block's structures. A block is a structure that contains the following properties: name, category, block type, block text, and list of contained blocks.

The generation is supported by an algorithm that implements loops iterating over the Conceptual Model following the order fixed by the document. In these iterations, the document is built creating and linking the blocks that constitute the document.

When the block structure is built, the resultant. structure, a tree of blocks, is processed by a translator to convert it to a document in the selected target language. This algorithm using recursive descent analysis is capable to convert the blocks to tags in the target language depending on the information stored in the block and contained blocks.

As example, a section block containing the text "Title" will be translated to the next string HTML equivalent: <H1>Title</H1 >

GENERATING FULL APPLICATIONS

Accordingly, an automatic software production tool is described that captures information requirements, also referred to as "business processes" from a triple perspective: static, dynamic and functional. This allows system designers and analysts to fully capture every aspect of the reality they model.

System Logic Translator is then responsible for gathering all this information, which would have been previously validated to assure correctness and completeness, and automatically produce code. that implements every aspect of the modeled reality. This system logic code has the following features:

The system logic code is complete and correct. Since information gathered by the System Logic Translator has been previously validated, produced code can be assured to be both complete and correct thanks to the set of translation recipes provided. The set of translation recipes cover every aspect that can be modeled by an analyst, so everything that can be expressed and captured in a Conceptual Model can be translated into source code. Every translation recipe assures for correct translation thus resulting in error-free source code.

The system logic code is for a full application, not just a prototype. Generated code can be compiled (with the appropriate compiler depending on the target programming language) and executed "as-is" because it is fully translated from the Conceptual Model information input. Generated code is not a mere collection of method skeletons but complete methods. Furthermore, no useless code is produced and no line of code is generated more than once. In addition to this, even being the generated code well structured and readable, comments can be automatically generated as a means of internal code documentation thus improving readability.

The system logic code is robust and includes error checking and handling. Correctness and completeness allow for the production of robust code. According to the information in the Conceptual Model, errors fall into two categories: model or internal errors and external errors. Internal errors correspond to properties that must hold at a given instant according to the Conceptual Model (e.g.: a precondition that does not hold, an integrity constraint, violation of a maximum cardinality of an aggregation relationship, etc.) External errors correspond to causes alien to the Conceptual Model (e. g.: a system failure, a database failure, etc.).

The generated code handles errors according to this classification as follows: For internal errors, the system logic translator identifies every point where an internal error might occur then produces error checking and handling code to notify the client about such an error's occurrence. Again, internal errors can be categorized and given a specific treatment, such as customizable error messages and error codes. For external errors, the system logic translator identifies every point where an external error might occur then produces error checking and handling code to notify the client about such an error's occurrence. Since external errors cannot be categorized, they are treated in the same standard way.

Therefore, the automatic production of error checking and handling code for every possible situation can assure any translation of a Conceptual Model to be robust.

The system logic code handles transactional behavior. The generated code presents transactional behavior in the sense that the code provides clients a well-defined interface, which allows them to request services from the system. Those services are executed in a transactional way: every input argument of the service must be provided by the client, then system logic performs the corresponding operations and replies to the client. Services in a Conceptual Model can be in turn decomposed into actions. The generated code assures for all actions composing a service be successfully accomplished or none of them. In addition, changes to objects affected by the actions a service is divided into do not effectively take place until all these actions have successfully terminated. Transactional behavior also enhances integration with legacy systems.

The system logic code is independent from the user interface. The generated code provides a well-defined interface allowing for clients to request services. But this interface does not depend on the clients interacting with it. This allows for a heterogeneous set of clients interacting with the same system logic. Thus, clients for specific system logic need only know the interface it will present to them. This feature facilitates the deployment of Internet applications and also enhances integration with legacy systems and decomposition of huge information systems or Conceptual Models into smaller ones, which, due to their well-defined interfaces, can interact with each other.

The system logic code is independent from the persistence layer. The generated code is responsible for interacting with the persistence layer implementing what is regarded as "persistence services". These services are responsible for: adding, retrieving, updating, and deleting information in the persistence layer. These services are necessary for the system logic to perform its tasks but, in addition to this, system logic hides the persistence layer to clients by providing services to perform queries on the persistence layer. This implies that clients need not know the physical location of the persistence layer; need not know the structure of the persistence layer, because they are provided with services to perform queries on the persistence layer; need not be authorized users of the persistence layer because access to the persistence layer is entirely managed by the system logic; and need not even know that there is a persistence layer.

To sum up, the code automatically produced by the automatic software production system of one embodiment of the present invention corresponds to that of a true final software application, instead of that of just a prototype. To maintain this distinction, some of the differences between the generated system logic code from that of a prototype are explained.

(1) Completeness: A prototype does not fully cover functionality of an information system, nor is it intended for every possible flow of execution, while our automatically generated code, being a final application, totally covers the functionality captured in the corresponding Conceptual Model, as well as every possible flow of execution.

(2) Correctness: A prototype aims to verify user's needs and requirements and verify correctness of execution. The automatically generated code in accordance with an embodiment of the present invention, on the other hand, aims to verify user's needs and requirements, for it is correctly generated.

(3) Robustness: A prototype is not robust, because the prototype is not produced with error checking and handling code. Rather, this code is not produced, typically by hand, until the very last step of codification, where user's needs and requisites have proven to be satisfied and a final application can then be produced. A final application, such is the case of our automatically generated code, must come with all the code necessary to assure robustness. Since this is usually codified by hand, programmers often forget to add such code in many places where needed. This leads to high costs of maintenance and disrupts the balance between system logic code and error checking and handling code. The system logic translators described herein provides all the necessary (and just than the necessary) code to deal with error checking and handling.

(4) Scalability: Prototypes are not scalable because they tend to be discarded during the process of validating user's needs and requisites. Final applications can be designed to be scalable because they aim to last much longer than a prototype. Nevertheless scalability implies following certain guidelines during design phase. With embodiments of the invention, system analysts need not worry about scalability because such a task falls under the System Logic Translator 232 responsibilities. So, analysts focus on analysis matters knowing that the resulting code will be scalable. Furthermore, different Conceptual Models translated by the System Logic Translator can interact with each other through their well-defined interfaces.

While this invention has been described in connection with what is presently considered to be the most practical and preferred embodiment, it is to be understood that the invention is not limited to the disclosed embodiment, but on the contrary, is intended to cover various modifications and equivalent arrangements included within the spirit and scope of the appended claims.

What is claimed is:

1. An automated software production tool, comprising:
a CASE tool for controlling a computer to provide a user interface that provides tools which a user can invoke to create a conceptual model comprised of an object model, a dynamic model, a functional model and a presentation model, said conceptual model being an abstract graphical representation of a solution to a problem wherein said conceptual model will be automatically translated into a computer program which will be able to control a computer to provide said solution of said problem said user is trying to solve, said object model being a graphical model of the objects to be employed in said computer program and defining classes of said objects, said dynamic model specifying valid object life cycles for each objects defined in said object model and inter-object communications between objects in response to services, triggers and global transactions, said functional model specifying valuations of objects which means how every event changes an object's state depending upon the arguments of the involved event and the object's current state, and said presentation model being built using tools or icons representing basic patterns in user interfaces and defining a desired user interface behavior for said computer program, and said CASE tool for automatically converting said conceptual model into a formal language specification written in an unambiguous, object-oriented, formal language having predetermined precise rules of grammar, syntax and semantics which are such that said formal specification can be validated to ensure that said formal language specification is an unambiguous, correct and complete statement of said solution of said problem said user is trying to solve;
a computer-readable medium for storing said formal specification;
a validator for validating said formal language specification to ensure that said formal language specification is complete and correct, "complete" meaning all the required properties of said conceptual model are defined and have a value, and "correct" meaning the information introduced in the conceptual model by the user complies with said rules of syntax of said formal language and is semantically consistent and not ambiguous, said validator outputting a validated formal language specification of said solution to said problem prior to automatic translation of said validated formal language specification into computer program code; and a translator for automatically generating computer program code that can either control a computer to solve said problem or which can be compiled into an executable form which can control a computer to solve said problem, said computer program code being a complete, automatically generated computer program implementation in a predetermined, user chosen computer program language of said validated formal language specification, and wherein said computer program code includes instructions for handling said user interface in accordance with said patterns specified in said presentation model.

2. The tool according to claim 1, wherein said CASE tool presents a graphical user interface to allow a user to input requirements for said desired computer program and generating said formal language specification based on said user inputs.

3. The tool according to claim 2, wherein said CASE tool is further configured to provide user interface tools for accepting user input specifying one or more valuations each of which indicates how an event changes the value of a variable attribute for which said valuation is defined.

4. The tool according to claim 3, wherein said valuation is selected from a set consisting essentially of push-pop, state-independent, and discrete-domain.

5. The tool according to claim 1, wherein said formal language specification includes requirements for error checking and error handling so as to cause said software program to have robust behavior, and wherein said translator is configured for automatically generating computer code for said software program which implements said error checking and error handling requirements by including computer instructions for error checking and handling in the automatically generated computer code of said software program.

6. The tool according to claim 5, wherein said translator is configured for generating instructions in said automatically generated computer code of said software program for checking and handling internal errors by checking said formal specification for every point where an internal error might occur and generating instructions to notify the user of the error's occurrence if such an internal error occurs, where said internal errors correspond to properties that must hold at a given instant according to said conceptual model.

7. The tool according to claim 5, wherein said translator is configured for generating instructions for checking and handling external errors corresponding to errors foreign to the conceptual model such as hard disk failure, database failure and other such errors, said error handling instructions generated by anticipating every point in the automatically generated computer instructions where an external error might occur and generating instructions to notify the user of the error's occurrence if such an external error occurs.

8. The tool according to claim 1, further comprising a documentation generator for producing documentation for said automatically generated computer program based on said formal language specification.

9. An automated software production tool, comprising:

CASE tool for presenting a graphical user interface to allow a user to input formal requirements for a computer program to be generated by said automated software production tool and generating a formal language specification for said computer program based on said formal requirements written in a formal language such that every formal requirement input by said user is recorded as one or more elements of said formal language specification each of which has predetermined rules of syntax and semantics;

a validator for semantically and syntactically validating said formal language specification to ensure said formal language specification is complete, correct and non ambiguous so as to generate a validated formal language specification; and a translator for automatically generating computer code for said computer program based on said validated formal language specification.

10. The tool according to claim 9, wherein:

said CASE tool displays tools, menu choices, icons, or any other mechanisms of a graphical user interface which can be invoked by a user of said CASE tool to specify said formal requirements to include patterns for a desired user interface to be presented to a user of said computer program to be generated by said automated software production tool; and wherein said translator is constructed so as to use said patterns specifying said desired user interface to generate in said final computer program instructions to control a computer executing said computer program to implement said desired user interface in accordance with said patterns.

11. The tool according to claim 9, wherein:

said formal requirements entered by said user define a conceptual model of said computer program; and said translator includes a system logic translator structured to identify every point in said conceptual model where an internal error might occur, where internal errors correspond to properties of said conceptual model which must be true at a given instant, and wherein said translator is structured to generate instructions in said computer program to control a computer executing said computer program to detect if an internal error has occurred and to notify a user of said computer program of said error's occurrence, and wherein said translator is further structured to anticipate every point in the automatically generated computer instructions of said computer program generated by said translator where an external error might occur and generate instructions to notify the user of the external error's occurrence if such an external error occurs, where external errors correspond to errors foreign to such conceptual model such as hard disk failure, database failure and other such errors.

12. The tool according to claim 9, wherein said CASE tool is further configured to control a computer to present graphical user interface mechanisms by which a user can specify for any object specified by said computer program to be written one or more valuations that control how the occurrence of one or more events will change the state of said object, where the state of said object is defined as the current value of all its attributes.

13. The tool according to claim 12, wherein said valuation(s) are selected from a set consisting essentially of push-pop, state-independent, and discrete-domain.

14. An automated software production tool, comprising:
- a computer-readable medium for storing a specification written in any formal language having predetermined rules of syntax and semantics said formal language specification specifying a Conceptual Model that includes user supplied requirements for a computer program to be generated automatically by said automated software production tool and which is robust in that it includes instructions to detect and notify a user of both internal and external errors when they occur, where internal errors occur when a property of said Conceptual Model required to be true at a given instant is not satisfied, and where external errors correspond to errors foreign to such Conceptual Model such as hard disk failure or a database failure;
- a validator for validating syntax and semantics of statements in said formal language specification to determine that said Conceptual Model is correct, complete, and unambiguous so as to generate a validated formal language specification; and
- a translator for automatically generating computer code of said computer program from said validated formal specification, wherein said computer program includes instructions for detection of internal and external errors and notification of a user of said computer program of the occurrence of said errors.

15. The tool according to claim 14, further comprising a CASE tool for presenting a graphical user interface to present at least diagrams and interactive dialog boxes that allow a user to input unambiguous formal requirements for said computer program and automatically generating said formal language specification based on said formal requirements input for said computer program.

16. The tool according to claim 15, wherein said CASE tool is further configured to control a computer to display a graphical user interface to allow a user to enter input specifying for each variable attribute of each object one or more valuations that indicates how an event changes the value of said attribute.

17. The tool according to claim 16, wherein said graphical user interface of said CASE tool further allows specification of user interface patterns and population of said patterns with data which will create a presentation model of a desired user interface for said computer program, and wherein said CASE tool automatically converts said presentation model into statements in said formal language of said formal language specification which define said desired user interface, and wherein said validator is structured to validate said statements in said formal specification which define said user interface, and wherein said translator is structured to use said statements in said formal language specification which define said user interface to add computer code to said computer program which controls a computer executing said computer program to implement the user interface having said patterns defined by said presentation model.

18. A method for automatically generating a computer program, comprising:
- accessing a formal language specification written in a formal language which has predetermined precise rules of syntax and semantics such that said formal language specification is guaranteed to be non ambiguous and can be validated to be complete and correct using said rules of syntax and semantics, said formal language specification being created from a Conceptual Model created by a user who specifies requirements for a computer program to be automatically generated, said Conceptual Model including a Presentation Model which specifies through the use of predetermined patterns a desired user interface for said computer program to be automatically generated;
- validating said formal language specification using rules of validation based upon said rules of syntax and semantics of said formal language to ensure said formal specification is complete and correct and unambiguous to generate a validated formal language specification; and
- automatically generating said computer program in a computer language that can be immediately executed by a computer or compiled into an executable form from said validated formal language specification, and wherein said automatic generation step includes, based upon portions of said formal language specification which define said desired user interface, inserting computer instructions which control a computer executing said computer program to have a desired user interface in accordance with said patterns specified in said Presentation Model.

19. The method according to claim 18, further comprising the steps of:
- using a CASE tool to control a computer to present a graphic user interface to provide tools a user can invoke to construct said Conceptual Model, said tools including tools which represent patterns of user interface methodologies which can be specified to define said Presentation Model which defines said desired user interface;

and wherein:
- said requirements are entered by said user using said tools presented by said CASE tool, and include requirements for error detection and handling to detect the occurrence of internal and external errors and notify a user of said computer program regarding the occurrence of said errors so as to create a robust computer program; and
- said translation step includes steps to determine where in said Conceptual Model internal and external errors are likely to occur and to add instructions for error checking and handling to said computer program to detect the occurrence of said errors and notify a user of said computer program.

20. The method according to claim 19, wherein said CASE tool controls a computer executing said CASE tool so as to provide tools for invocation by an analyst building said Conceptual Model to allow said analyst to enter input specifying for selected ones of each variable attribute in selected ones of each class in said Conceptual Model one or more valuation formulas, each valuation formula defining how an event changes the value of a variable attribute.

21. The method according to claim 20, wherein each said valuation is selected from a set consisting essentially of push-pop, state-independent, and discrete-domain.

22. The method according to claim 18, further comprising the step of producing documentation for said computer program based on said formal language specification.

23. A method for automatically generating a computer program, comprising:
- controlling a computer with an editor program so as to present a graphical user interface to provide tools which can be invoked by a user to input requirements for a computer program to be written automatically to implement said requirements, said requirements defining a Conceptual Model which defines the desired computer program's functionality and at least parts of said Conceptual Model being displayed graphically on said computer executing said editor program;

automatically generating a formal language specification for said computer program based on said conceptual model, said formal language specification being written in a formal language with precise rules of syntax and semantics;

validating said formal language specification using said rules of syntax and semantics to ensure that said formal language specification is complete and correct and not ambiguous to generate a validated formal language specification; and automatically generating said computer program based on said validated formal language specification.

24. The method according to claim 23, wherein said step of controlling a computer with an editor program includes controlling said computer to display a graphical user interface that provides tools which can be invoked to specify a desired user interface for said computer program in terms of patterns, with the patterns specified by said user comprising a Presentation Model; and wherein said step of automatically generating said computer program includes the steps of adding to said computer program instructions for controlling a computer executing said computer program to provide a user interface in accordance with said patterns specified in said Presentation Model.

25. The method of claim 23, wherein said step of automatically generating said computer program includes the steps of determining every point in said Conceptual Model where an internal error might occur and adding computer instructions to said computer program to detect the occurrence of such an internal error and to notify a user of said computer program that said error occurred, where an internal error occurs when a property required by said Conceptual Model to be true at a particular instant is not satisfied.

26. The method according to claim 25, wherein said step of automatically generating said computer program further comprises the steps of identifying every point where an external error might occur and adding instructions to said computer program which detect the occurrence of an external error and notify a user of said computer program of the occurrence of said error.

27. The method according to claim 23 wherein said validating step includes the steps of verifying the completeness of said formal language specification by determining whether there is any missing information therein meaning that all required properties of said Conceptual Model are defined and have a value, and verifying the correctness of said formal language specification by verifying that all the information entered during construction of said Conceptual Model using said editor is syntactically and semantically consistent and not ambiguous and that all properties defined in said Conceptual Model have valid values.

28. The method according to claim 27 wherein said Conceptual Model includes formulas and where said step of validating further comprises the steps of verifying the syntax and semantics of all said formulas in said Conceptual Model.

29. The method according to claim 23 wherein said Conceptual Model includes formulas, and wherein said step of validating includes steps of verifying that the properties of every element in said formal language specification exist and have valid values and that all said formulas in said formal language specification are syntactically and semantically correct where every type of formula has a predefined process and grammar to verify the correctness of said formula.

30. A method for automatically generating a computer program, comprising:

controlling a computer with an editor program to present a user interface which provides tools which can be invoked by an analyst to create a graphical representation of a Conceptual Model of a computer program to be automatically generated using said Conceptual Model, said Conceptual Model including information that defines classes of objects and the attributes and services of each object in a class, as well as the relationships between classes, a state transition diagram which defines the permissible state transitions of each object including information that defines the creation and deletion of an object and formulas that control transitions between states, an object interaction diagram that defines how objects communicate with each other, and formulas which define how events change the values of variable attributes of said objects, and information defining patterns of a desired user interface, said editor program controlling said computer to automatically convert said Conceptual Model to a formal language specification written in a formal language with rules of syntax and semantics and to provide notification to said analyst when a mistake of syntax or semantics results in generation of said formal language specification resulting from information defining said Conceptual Model entered by said analyst and providing information which assists said analyst in correcting the entered information to correct said mistake;

accessing said formal language specification from a computer readable medium upon which said formal language specification is stored by said editor program;

validating said formal language specification to determine that said Conceptual Model is correct meaning that the information entered to define said Conceptual Model is syntactically and semantically consistent according to a grammar of said formal language used to write said specification, and not ambiguous, and complete meaning that there is no information in said Conceptual Model required by the rules of syntax or semantics which is missing in said formal language specification such that all properties required by said Conceptual Model are defined and have a valid value; and automatically generating said computer program using said formal language specification so as to implement all the structure and behavior, properties and services and said user interface defined in said Conceptual Model.

31. The method according to claim 30, further comprising the steps of determining all the points in said Conceptual Model where an internal error might occur and adding instructions to said computer program to detect the occurrence of an internal error and control said computer to notify a user of said computer program of the occurrence of said error, and anticipating every point in said automatically generated computer program where an external error might occur and generating instructions in said computer program to detect the occurrence of such an external error and notify a user of its occurrence.

32. A computer-readable medium bearing instructions for controlling a computer to automatically generate a computer program from a formal language specification, said instructions being arranged to cause one or more processors upon execution thereby to perform the steps of:

accessing a formal language specification written in a formal language which has predetermined precise rules of syntax and semantics such that said specification is guaranteed to be non ambiguous and can be validated to be complete and correct using said rules of syntax and semantics, said formal language specification being created from a Conceptual Model created by a user that specifies requirements for a computer program to be automatically generated, said Conceptual Model including a Presentation Model which specifies through the use of predetermined patterns a desired user interface for said computer program to be automatically generated;

validating said formal language specification using said rules of syntax and semantics to ensure said formal specification is complete and correct and unambiguous to generate a validated formal language specification; and automatically generating said computer program in a computer language that can be immediately executed by a computer or compiled into an executable form from said validated formal language specification, and wherein said automatic generation step includes, based upon portions of said formal language specification which define said desired user interface, inserting computer instructions which control a computer executing said computer program to have a desired user interface in accordance with said patterns specified in said Presentation Model.

33. The computer-readable medium according to claim 32, wherein said computer readable medium bears instructions to control a computer to locate all points in said Conceptual Model where an internal error might occur and add instructions to said automatically generated computer program to detect the occurrence of an internal error and notify a user of said computer program of the occurrence of said error, and further bearing instructions to control a computer to anticipate during said process of automatically generating said computer program all points in said generated program where an external error might occur and add instructions to said computer program to detect the occurrence of said external error and notify a user of said computer program of the occurrence of said external error.

34. The computer-readable medium according to claim 32, further bearing instructions for controlling a computer with an editor program to present a graphical user interface which includes tools which an analyst can invoke to build a graphical representation of said Conceptual Model, said Conceptual Model defining classes of objects, attributes of said classes, services and behavior and interactions of said objects, valuation formulas that change the values of variable attributes of said objects upon the occurrence of events, and patterns of a desired user interface for said computer program and instructions to automatically convert said Conceptual Model to said formal language specification written in a formal language.

35. The computer-readable medium according to claim 32 wherein said computer-readable medium further bears instructions for automatically producing documentation for said computer program based on said formal language specification.

36. A computer-readable medium bearing instructions for controlling a computer to present tools for an analyst to specify the requirements for a computer program to be written and to automatically generate said computer program, said instructions being arranged to cause one or more processors upon execution thereby to perform the steps of:

controlling a computer with an editor program to present a user interface which provides tools which can be invoked by an analyst to create a graphical representation of a Conceptual Model of a solution to a problem that a computer program to be automatically generated using said Conceptual Model will solve, said Conceptual Model defining classes of objects, and attributes and services for each class as well as relationships between classes, a state transition diagram which defines the permissible state transitions of each object including information that defines the creation and deletion of an object and control condition formulas that control transitions between states, an object interaction diagram that defines how objects communicate with each other, and valuation formulas which define how events change the values of variable attributes of said objects, and information defining patterns of a desired user interface, said editor program controlling said computer to automatically convert said Conceptual Model to a formal language specification written in a formal language with rules of syntax and semantics and to provide notification to said analyst when a mistake of syntax or semantics has occurred in information defining said Conceptual Model entered by said analyst;

accessing said formal language specification from a computer readable medium upon which said formal language specification is stored by said editor program;

validating said formal language specification to determine that said Conceptual Model is correct meaning that the information entered to define said Conceptual Model is syntactically and semantically consistent according to a grammar of said formal language used to write said specification, and not ambiguous, and complete meaning that there is no missing information required by said Conceptual Model and the rules of syntax or semantics of said formal language such that all properties required by said Conceptual Model are defined and have a valid value; and automatically generating said computer program using said formal language specification so as to implement all the structure and behavior, properties and services and said user interface defined in said Conceptual Model.

37. The computer-readable medium according to claim 36, wherein said computer readable medium further bears instructions to control said computer to impose integrity constraints on said classes and implement derivation expressions for derived attributes of classes.

38. The computer-readable medium of claim 36, wherein said computer readable medium further includes instructions to control a computer to identify the points in said Conceptual Model where an internal error might occur and to add instructions to said automatically generated computer program to control a computer executing said computer program to detect the occurrence of one or more of said error(s) and notify a user of said computer program of the occurrence of said error(s).

39. The computer-readable medium according to claim 38, further bearing instructions for generating instructions for checking and handling external errors.

40. The computer-readable medium according to claim 38, wherein said computer-readable medium further bears instructions for controlling a computer using said editor program to automatically generate said formal language specification in a formal language have strict rules of syntax and semantics.

41. The computer-readable medium according to claim 36 further bearing instructions to control a computer to validate said formal language specification for correctness by verifying that every element of said formal language specification has a set of properties that both exist and have valid values before automatic generation of said computer program but which, for ease of use during reception of data to define said Conceptual Model, allows some properties to have incomplete or invalid values temporarily.

42. The computer-readable medium according to claim 36 further bearing instructions to control a computer to validate said formal language specification for completeness by verifying that all formulas entered in said Conceptual Model are syntactically and semantically correct according to predetermined rules of grammar of said formal languages.

43. A computer-readable medium bearing instructions for controlling a computer to provide tools to define a Conceptual Model of a computer program to be written and to automatically generate said computer program, said instructions being arranged to cause one or more processors upon execution thereby to perform the steps of:

using a CASE tool to control a computer to present a graphical user interface mechanism to provide tools a user can invoke to construct a Conceptual Model which defines the structure and behavior of a computer program to be automatically written by a computer, said tools including tools which represent patterns of user interface methodologies which can be specified to define a Presentation Model which defines a desired user interface for said computer program to be automatically written, said CASE tool for automatically converting said Conceptual Model into a formal language specification written in a mathematically based formal language having strict, predefined rules of syntax and semantics which together comprise a grammar and for notifying said user whenever any error of semantics or syntax results from information entered by said user in defining said Conceptual Model;

accessing said formal language specification;

validating said formal language specification using rules of validation based upon said rules of syntax and semantics of said formal language to ensure said formal language specification is complete and correct and unambiguous so as to generate a validated formal language specification; and automatically generating said computer program in a computer language that can be immediately executed by a computer or compiled into an executable form, said automatic generation step accomplished using said validated formal language specification, and wherein said automatic generation step includes, based upon portions of said formal language specification which define said desired user interface, inserting computer instructions which control a computer executing said computer program to have a desired user interface in accordance with said patterns specified in said Presentation Model.

* * * * *